United States Patent
Tu et al.

(10) Patent No.: US 12,182,684 B2
(45) Date of Patent: Dec. 31, 2024

(54) SEQUENCE MODEL PROCESSING METHOD AND APPARATUS

(71) Applicant: Tencent Technology (Shenzhen) Company Limited, Shenzhen (CN)

(72) Inventors: Zhaopeng Tu, Shenzhen (CN); Jie Hao, Shenzhen (CN); Xing Wang, Shenzhen (CN); Longyue Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 983 days.

(21) Appl. No.: 17/182,029

(22) Filed: Feb. 22, 2021

(65) Prior Publication Data
US 2021/0174170 A1    Jun. 10, 2021

Related U.S. Application Data

(63) Continuation of application No. PCT/CN2019/118982, filed on Nov. 15, 2019.

(30) Foreign Application Priority Data

Nov. 30, 2018    (CN) .......................... 201811458681.0

(51) Int. Cl.
*G06N 3/045*    (2023.01)
*G06F 40/58*    (2020.01)
*G06N 3/049*    (2023.01)

(52) U.S. Cl.
CPC .............. *G06N 3/045* (2023.01); *G06F 40/58* (2020.01); *G06N 3/049* (2013.01)

(58) Field of Classification Search
CPC ......... G06N 3/045; G06N 3/049; G06F 40/58
See application file for complete search history.

(56) References Cited

U.S. PATENT DOCUMENTS 10,706,450 B1 *    7/2020    Tavernier ............ G06F 16/9535
2018/0060666 A1 *    3/2018    Song ........................ G06N 3/04
(Continued)

FOREIGN PATENT DOCUMENTS

CN    107357789 A    11/2017
CN    107368718 A    11/2017
(Continued)

OTHER PUBLICATIONS

Tencent Technology, ISR, PCT/CN2019/118982, Feb. 6, 2020, 2 pgs.
(Continued)

*Primary Examiner* — Beau D Spratt
(74) *Attorney, Agent, or Firm* — Morgan, Lewis & Bockius LLP

(57) ABSTRACT

Embodiments of this application disclose a sequence model processing method and apparatus, to improve a task execution effect of a sequence model. The method includes: inputting a source sequence into an encoder side of a sequence model, the encoder side including a self-attention encoder and a temporal encoder; encoding the source sequence by using the temporal encoder, to obtain a first encoding result, the first encoding result including time series information obtained by performing time series modeling on the source sequence; and encoding the source sequence by using the self-attention encoder, to obtain a second encoding result; inputting a target sequence, the first encoding result, and the second encoding result into a decoder side of the sequence model; and decoding the target sequence, the first encoding result, and the second encoding result by using the decoder side, and outputting a decoding result obtained after the decoding.

17 Claims, 11 Drawing Sheets

(56) References Cited

U.S. PATENT DOCUMENTS

| | | | | |
|---|---|---|---|---|
| 2018/0240010 A1* | 8/2018 | Faivishevsky | ............ | G06N 3/08 |
| 2019/0130213 A1* | 5/2019 | Shazeer | ................ | G06F 18/213 |
| 2019/0251431 A1* | 8/2019 | Keskar | .................... | G06F 40/30 |
| 2019/0354836 A1* | 11/2019 | Shah | ...................... | G06N 3/045 |
| 2020/0017117 A1* | 1/2020 | Milton | ................. | G08G 1/0112 |
| 2020/0356838 A1* | 11/2020 | Selvakumar | .......... | G06F 18/214 |
| 2021/0004682 A1* | 1/2021 | Gong | ....................... | G06N 3/08 |

FOREIGN PATENT DOCUMENTS

| | | | |
|---|---|---|---|
| CN | 107590168 A | 1/2018 | |
| CN | 107632981 A | 1/2018 | |
| CN | 108615009 A | 10/2018 | |
| CN | 108763230 A | 11/2018 | |
| CN | 108766414 A | 11/2018 | |
| CN | 108829667 A | 11/2018 | |
| CN | 109543824 A | 3/2019 | |
| WO | WO 2018124309 A1 | 7/2018 | |

OTHER PUBLICATIONS

Ashish Vaswani et al., "Attention Is All You Need", Dec. 6, 2017, 4 pgs., Retrieved from the Internet: https://arxiv.org/abs/1706.03762v5.

Tencent Technology, WO, PCT/CN2019/118982, Feb. 6, 2020, 5 pgs.

Tencent Technology, IPRP, PCT/CN2019/118982, May 25, 2021, 6 pgs.

\* cited by examiner

SEQUENCE MODEL PROCESSING METHOD AND APPARATUS

CROSS REFERENCE TO RELATED APPLICATIONS

This application is a continuation application of PCT Patent Application No. PCT/CN2019/118982, entitled "SEQUENCE MODEL PROCESSING METHOD AND APPARATUS" filed on Nov. 15, 2019, which claims priority to Chinese Patent Application No. 201811458681.0, filed with the State Intellectual Property Office of the People's Republic of China on Nov. 30, 2018, and entitled "SEQUENCE MODEL PROCESSING METHOD AND APPARATUS", all of which are incorporated herein by reference in their entirety.

FIELD OF THE TECHNOLOGY

This application relates to the field of computer technologies, and in particular, to a sequence model processing method and apparatus.

BACKGROUND OF THE DISCLOSURE

A sequence model is used for implementing various tasks according to inputted sequence data. The sequence model may be implemented based on a self-attention network (SAN). The sequence model may be a neural machine translation model. For example, there is a Transformer model in the related art. The Transformer model is based on the foregoing SAN, and is formed by stacking a plurality of layers of SANs.

Compared with a neural machine translation model based on a recurrent neural network (RNN) in the related art, the Transformer model replaces the RNN with the SAN to model a dependency relationship between sequences. The RNN operates sequentially in a recurrent manner (that is, an output of each step is used as an input of a next step). However, the network training speed is low for the neural machine translation model based on an RNN, and the recurrent structure of the RNN also increases the training difficulty. Instead, the SAN can process all words or symbols in a current sequence in parallel. The Transformer model achieves best performance on a plurality of language pair tasks, and is a new reference model for neural machine translation at the current research stage.

In the related art, the sequence model calculates a dependency relationship between sequence elements merely depending on the SAN, and therefore, a task implementation effect is poor when the sequence model is used for task execution. For example, in the related art, the Transformer model calculates a dependency relationship between sequence elements merely depending on the SAN, which usually affects the translation quality, including causing translation errors and translation omissions.

SUMMARY

Embodiments of this application provide a sequence model processing method and apparatus, to improve the modeling capability of a sequence model in time series modeling, thereby improving a task execution effect. The embodiments of this application provide the following technical solutions:

An embodiment of this application provides a sequence model processing method, the method including:
   inputting a source sequence into an encoder side of a sequence model, the encoder side including a self-attention encoder and a temporal encoder;
   encoding the source sequence by using the temporal encoder, to obtain a first encoding result, the first encoding result including time series information obtained by performing time series modeling on the source sequence;
   encoding the source sequence by using the self-attention encoder, to obtain a second encoding result;
   inputting a target sequence, the first encoding result, and the second encoding result into a decoder side of the sequence model; and
   decoding the target sequence, the first encoding result, and the second encoding result by using the decoder side, and outputting a decoding result obtained after the decoding.

An embodiment of this application further provides a sequence model processing apparatus, including:
   a first input module, configured to input a source sequence into an encoder side of a sequence model, the encoder side including a self-attention encoder and a temporal encoder;
   an encoding module, configured to encode the source sequence by using the temporal encoder, to obtain a first encoding result, the first encoding result including time series information obtained by performing time series modeling on the source sequence; and encode the source sequence by using the self-attention encoder, to obtain a second encoding result;
   a second input module, configured to input a target sequence, the first encoding result, and the second encoding result into a decoder side of the sequence model; and
   a decoding module, configured to decode the target sequence, the first encoding result, and the second encoding result by using the decoder side, and output a decoding result obtained after the decoding.

An embodiment of this application provides a computing device, including a processor and a memory, the memory being configured to store instructions, and the processor being configured to execute the instructions in the memory, so that the computing device performs the method according to any one of the foregoing aspects.

An embodiment of this application provides a non-transitory computer-readable storage medium, storing instructions that, when executed by a processor of a computing device, cause the computing device to perform the method according to the foregoing aspects.

In the embodiments of this application, a sequence model has an encoder side and a decoder side. The encoder side includes a self-attention encoder and a temporal encoder. After a source sequence is obtained from a source database, the source sequence may be separately encoded by using the temporal encoder and the self-attention encoder. A first encoding result outputted by the temporal encoder includes time series information obtained by performing time series modeling on the source sequence, and the self-attention encoder outputs a second encoding result. On the decoder side of the sequence model, a target sequence, the first encoding result, and the second encoding result may be decoded, and a decoding result obtained after the decoding is outputted. In the embodiments of this application, because the self-attention encoder and the temporal encoder are used simultaneously on the encoder side of the sequence model, the time series information is also inputted into the decoder side of the sequence model for decoding. The sequence model provided in the embodiments of this application encodes the source sequence by using the foregoing two encoders simultaneously, to generate the time series information through time series modeling, so that the sequence model can accurately calculate a dependency relationship between sequence elements during task execution, thereby improving a task execution effect of the sequence model.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person skilled in the art may still derive other drawings from these accompanying drawings.

DESCRIPTION OF EMBODIMENTS

To make the invention objectives, features, and advantages of this application clearer and more comprehensible, the following clearly and completely describes the technical solutions in the embodiments of this application with reference to the accompanying drawings in the embodiments of this application. Apparently, the embodiments described below are merely some rather than all of the embodiments of this application. All other embodiments obtained by a person skilled in the art based on the embodiments of this application shall fall within the protection scope of this application.

The terms "include", "contain" and any other variants thereof in the specification, claims, and accompanying drawings of this application are intended to cover a non-exclusive inclusion, so that a process, method, system, product, or device that includes a series of units is not necessarily limited to those units, but may include other units not expressly listed or inherent to such a process, method, product, or device.

Detailed descriptions are provided below.

An embodiment of the sequence model processing method in this application may be specifically applied to a scenario of modeling a sequence model, so that the sequence model can quickly and efficiently execute a task, thereby improving a task execution effect of the sequence model. For example, the task may be a neural machine translation task, a task of location data positioning in a map, a task of element relationship recognition in a network, or the like.

Figure 1:
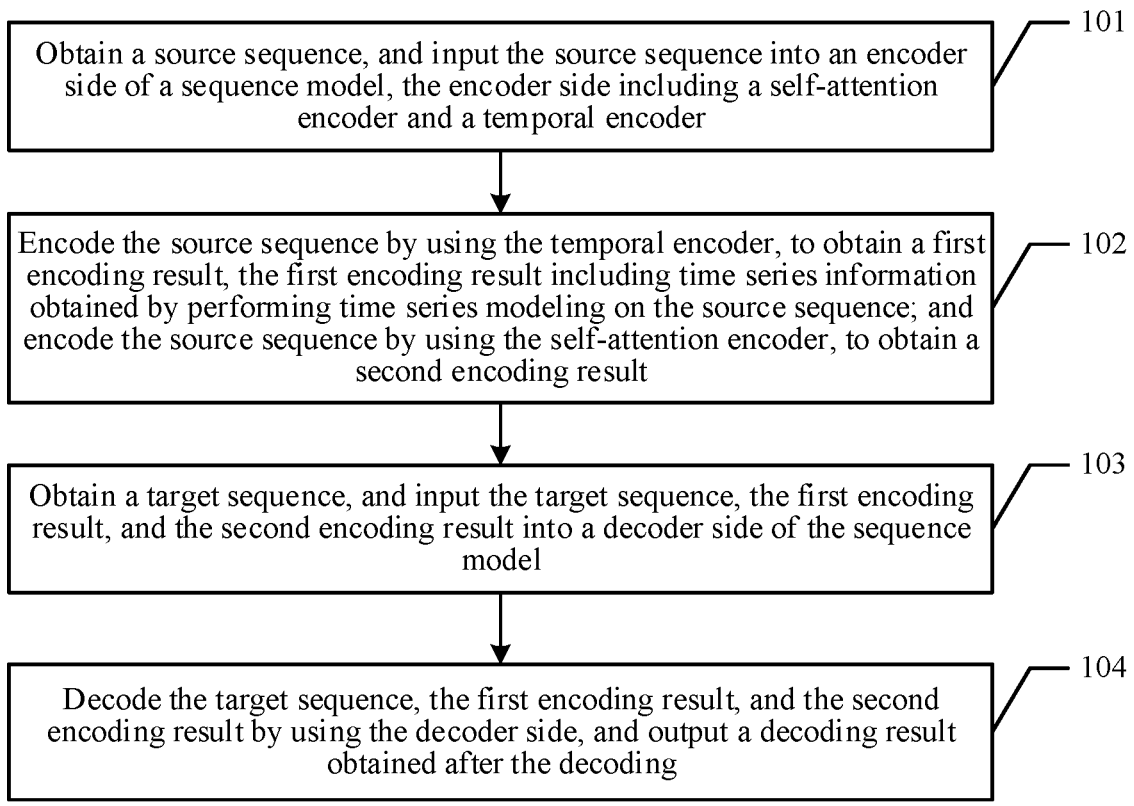
FIG. 1 is a schematic block flowchart of a sequence model processing method according to an embodiment of this application.

FIG. 1 is a flowchart of a sequence model processing method according to an embodiment of this application. The method may be performed by a computer device, and may include the following steps:

101: Obtain a source sequence, and input the source sequence into an encoder side of a sequence model, the encoder side including a self-attention encoder and a temporal encoder.

In this embodiment of this application, the sequence model is a model entity that uses a sequence element as an input object and performs execution by using a machine learning algorithm. The sequence model may have various application scenarios. For example, the sequence model may be a neural machine translation model, or a model for location data positioning in a map, or a model for element relationship recognition in a network.

In this embodiment of this application, a sequence model has an encoder side and a decoder side. The encoder side and the decoder side may be respectively implemented based on respective network models, and algorithms used by the encoder side and the decoder side in the sequence model are not limited. The encoder side includes at least two different types of encoders.

Figure 2:
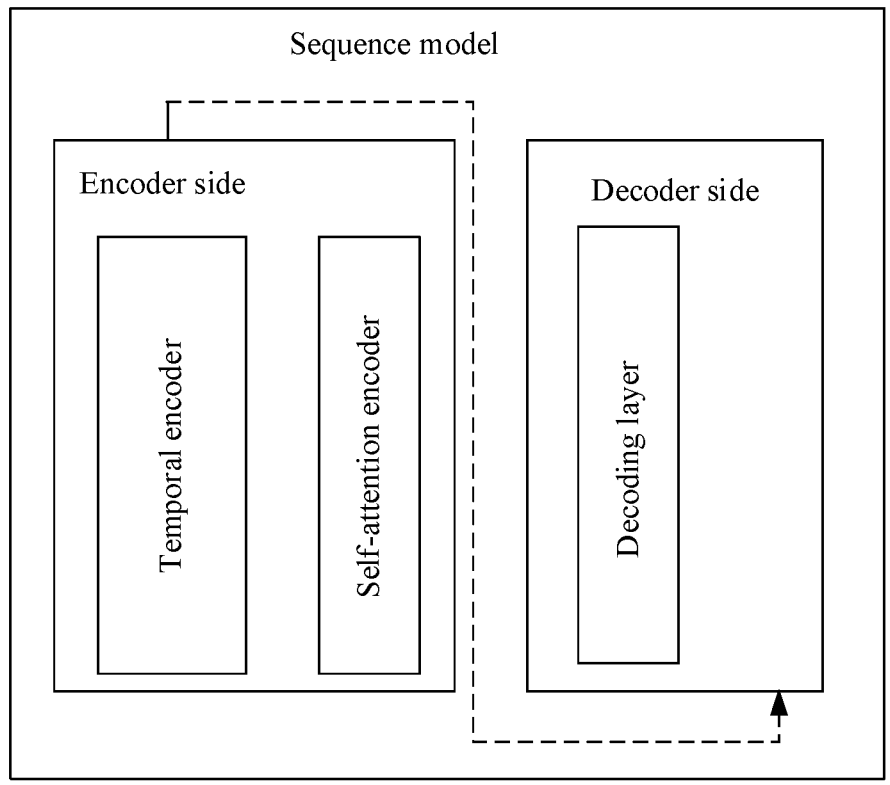
FIG. 2 is a schematic diagram of a composition structure of a sequence model according to an embodiment of this application.

FIG. 2 is a schematic diagram of a composition structure of a sequence model according to an embodiment of this application. For example, the encoder side of the sequence model may include a self-attention encoder and a temporal encoder.

The self-attention encoder may be an encoder implemented based on a self-attention network. For example, the self-attention network may be a self-attention neural network. The self-attention neural network is a neural network structure model based on a self-attention mechanism. On the encoder side of the sequence model, in addition to the self-attention encoder, the encoder side further includes a temporal encoder. The temporal encoder is an additional encoder other than the self-attention encoder in the sequence model. For example, the temporal encoder may be an encoder used for time series modeling. The temporal encoder may be an encoder implemented based on a neural network. For example, the temporal encoder may use an RNN, or a convolutional neural network (CNN).

For example, the sequence model provided in this embodiment of this application may be a neural machine translation model, for example, a Transformer model. A self-attention encoder and a temporal encoder may be used on an encoder side of the Transformer model. Therefore, in the Transformer model, time series information may be modeled by using the temporal encoder. The temporal encoder may introduce an additional network structure to model time series information, to improve the performance of a neural machine translation system. In subsequent embodiments, detailed descriptions are provided by using an example in which a Transformer model executes a translation task.

In this embodiment of this application, a source database is first obtained. The source database stores a plurality of source sequences required for being inputted into the sequence model. After a source sequence is obtained from the source database, the source sequence may be inputted into the encoder side of the sequence model, and the at least two encoders included in the encoder side encode the source sequence. Descriptions are provided below by using an example in which the sequence model is a Transformer model. A Chinese word sequence may be inputted into the Transformer model, and an encoder side of the Transformer model may encode the Chinese word sequence.

Optionally, the source sequence is a word sequence of a to-be-translated text.

102: Encode the source sequence by using the temporal encoder, to obtain a first encoding result, the first encoding result including time series information obtained by performing time series modeling on the source sequence; and encode the source sequence by using the self-attention encoder, to obtain a second encoding result.

In this embodiment of this application, after being inputted into the encoder side, the source sequence may be separately encoded by the two different types of encoders included in the encoder side. For example, the encoder side of the sequence model may include the self-attention encoder and the temporal encoder. The source sequence is encoded by using the temporal encoder, to obtain the first encoding result, and the source sequence is encoded by using the self-attention encoder, to obtain the second encoding result.

Respective encoding of the source sequence by the temporal encoder and the self-attention encoder may be performed in parallel. In addition, encoding manners respectively used by the temporal encoder and the self-attention encoder for the source sequence may be determined by respective machine learning network models used by the encoders.

In this embodiment of this application, to distinguish encoding of the source sequence by different encoders, an output of the temporal encoder is defined as the first encoding result, and an output of the self-attention encoder is defined as the second encoding result. It can be learned from the foregoing descriptions about the function of the temporal encoder that, the temporal encoder may perform time series modeling on the source sequence, and therefore, the first encoding result includes the time series information obtained by performing time series modeling on the source sequence. In this embodiment of this application, by integrating the temporal encoder on the encoder side, additional time series information may be provided to the sequence model, so that the sequence model can accurately calculate a dependency relationship between sequence elements during task execution, thereby improving a task execution effect of the sequence model.

In this embodiment of this application, it can be learned from the foregoing descriptions about the function of the self-attention encoder that, the self-attention encoder may extract encoding information that is based on the self-attention mechanism from the source sequence, so that the second encoding result includes the encoding information that is based on the self-attention mechanism and that is extracted from the source sequence. In this embodiment of this application, by integrating the self-attention encoder on the encoder side, the encoding information based on the self-attention mechanism may be provided to the sequence model. The second encoding result is combined with the first encoding result, so that the sequence model can accurately calculate a dependency relationship between sequence elements during task execution, thereby improving a task execution effect of the sequence model.

Figure 3:
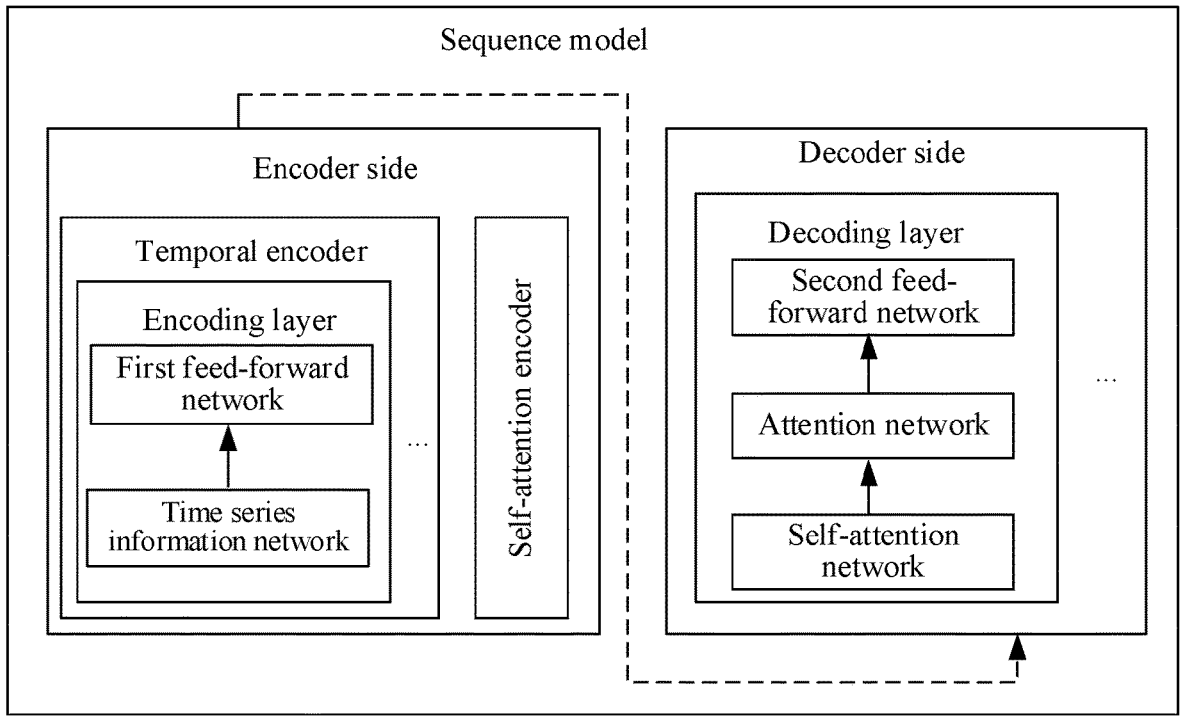
FIG. 3 is a schematic diagram of a composition structure of another sequence model according to an embodiment of this application.

In some embodiments of this application, FIG. 3 is a schematic diagram of a composition structure of another sequence model according to an embodiment of this application. The temporal encoder includes N encoding layers, N being a positive integer. For example, the temporal encoder may include one encoding layer, or two encoding layers. Each encoding layer includes a time series information network and a first feed-forward network. The time series information network is used for performing time series modeling on the source sequence to extract the time series information. For example, the time series information network may be a neural network. The first feed-forward network may be a basic neural network in which a parameter is unidirectionally propagated from an input layer to an output layer. For example, the first feed-forward network may be specifically a feed-forward neural network (FFNN).

In some embodiments of this application, based on the sequence model shown in FIG. 3, the encoding the source sequence by using the temporal encoder, to obtain a first encoding result in step 102 includes:

A1: performing time series modeling on the source sequence by using the time series information network, to obtain the time series information; and A2: unidirectionally propagating the time series information by using the first feed-forward network, and outputting the first encoding result.

The source sequence is first inputted into the temporal encoder of the encoder side. For example, the source sequence is inputted into the time series information network in the encoding layer of the temporal encoder. The source sequence may be inputted into the time series information network after location encoding, and then time series modeling is performed on the source sequence by using the time series information network, to obtain the time series information. For a modeling manner of the time series information, detailed calculation descriptions are provided in subsequent embodiments. After the time series information network outputs the time series information, the time series information may be unidirectionally propagated by using the first feed-forward network, to output the first encoding result. A calculation manner of the first feed-forward network is described in detail in subsequent embodiments.

Figure 4:
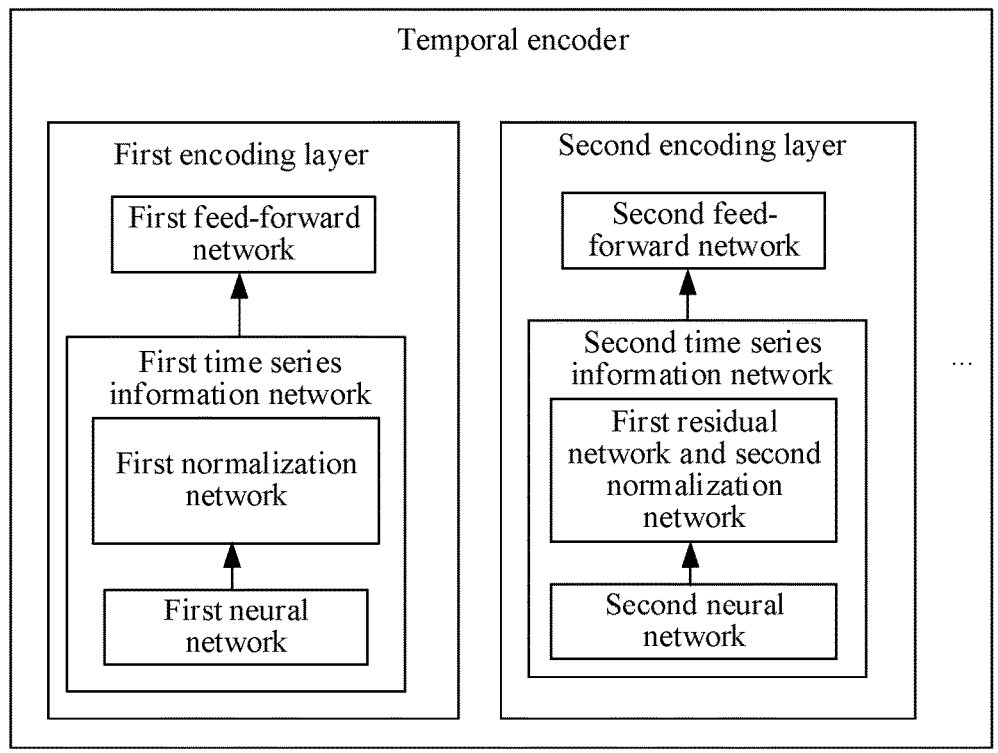
FIG. 4 is a schematic diagram of a composition structure of a temporal encoder according to an embodiment of this application.

In some embodiments of this application, FIG. 4 is a schematic diagram of a composition structure of a temporal encoder according to an embodiment of this application. The temporal encoder includes N encoding layers, N being a positive integer. For example, the temporal encoder may include one encoding layer, or two encoding layers. A first encoding layer in the temporal encoder includes a first time series information network and the first feed-forward network. The first time series information network may include a first neural network and a first normalization network. The neural network (NN) is a deep learning model that simulates the structure and functions of a biological neural network in the field of machine learning and cognitive science. Further, the first neural network is a bidirectional neural network; or the first neural network is an RNN, or an ARN. Descriptions are provided by using examples below. The RNN is a network model that converts sequence modeling into time series modeling. The RNN cyclically transmits a state therein. The ARN may be used for learning a compact, global feature representation for an input sequence. The ARN is a combination of the SAN and the RNN, and the RNN is the primary structure of the ARN. However, an input in each step is an output of the SAN. Detailed descriptions of the RNN and the ARN are provided in subsequent embodiments by using examples. The first normalization network is a network model that uses a normalization technology. For example, the first normalization network is represented by Layer norm. Values in a matrix are converted into values whose average value is 0 and whose variance is 1, and the operation is represented by LN( ).

In some embodiments of this application, based on the temporal encoder shown in FIG. 4, the performing time series modeling on the source sequence by using the time series information network, to obtain the time series information in step A1 includes:

A11: performing time series modeling on the source sequence by using the first neural network; and A12: performing, by using the first normalization network, normalization transformation on a result obtained through time series modeling, to obtain the time series information.

The first encoding layer is the $1^{st}$ encoding layer in the temporal encoder. The first encoding layer includes the first time series information network and the first feed-forward network. Therefore, time series modeling is first performed on the source sequence by using the first neural network, and then normalization transformation is performed, by using the first normalization network, on the result obtained through time series modeling, to obtain the time series information. It can be learned from the descriptions of the encoding process of the first encoding layer that, no residual network is used in the first encoding layer. That is, the first normalization network is directly used for processing after the first neural network performs time series modeling, and therefore, no residual network is used. An objective of this manner is to eliminate a restriction that a latent vector representation needs to be consistent with an input sequence in length, so that the temporal encoder is more flexible.

In some embodiments of this application, FIG. 4 is a schematic diagram of a composition structure of a temporal encoder according to an embodiment of this application. The temporal encoder includes N encoding layers, N being a positive integer. For example, the temporal encoder may include one encoding layer, or two encoding layers. The first encoding layer in the temporal encoder includes the first time series information network and the first feed-forward network. A second encoding layer in the temporal encoder includes a second time series information network and the first feed-forward network. The second time series information network includes a second neural network, a first residual network, and a second normalization network. It can be learned that, compared with the first time series information network, a residual network is added between the neural network and the normalization network in the second time series information network. The network structure of the second encoding layer may be applied to both a third encoding layer and a fourth encoding layer in the temporal encoder. That is, either of the third encoding layer and the fourth encoding layer includes a neural network, a residual network, and a normalization network.

Further, the second neural network is a bidirectional neural network; or the second neural network is an RNN, or an ARN. Descriptions are provided by using examples below. The RNN is a network model that converts sequence modeling into time series modeling. The RNN cyclically transmits a state therein. The ARN may be used for learning a compact, global feature representation for an input sequence. Detailed descriptions of the RNN or the ARN are provided in subsequent embodiments by using examples. The residual network may be described by using the following model: $y=f(x)+x$, where $f(x)$ represents a layer of neural network, and x is an input of this layer of network. No additional parameter or calculation complexity are introduced into the residual network. The residual network is used on both the encoder side and the decoder side. A function of the residual network is to avoid disappearance of a gradient, and thus a deeper network can be trained.

In some embodiments of this application, in addition to step A11 and step A12, the performing time series modeling on the source sequence by using the time series information network in step A1 further includes:

A13: performing, after the first feed-forward network in the first encoding layer outputs a first sublayer encoding result, time series modeling on the first sublayer encoding result by using the second neural network;

A14: performing, by using the first residual network, residual calculation on a result obtained through time series modeling; and A15: performing, by using the second normalization network, normalization transformation on a result obtained through residual calculation, to obtain the time series information.

The first feed-forward network in the first encoding layer outputs the first sublayer encoding result; then the second neural network performs time series modeling on the first sublayer encoding result; next, the first residual network is used to perform residual calculation on the result obtained through time series modeling; and finally, the second normalization network is used to perform normalization transformation on the result obtained through residual calculation, to obtain the time series information. It can be learned from the descriptions of the encoding process of the first encoding layer and the second encoding layer that, no residual network is used in the first encoding layer, and a residual network is used in the second encoding layer. That is, the first normalization network is directly used for processing after the first neural network performs time series modeling, and therefore, no residual network is used. An objective of this manner is to eliminate a restriction that a latent vector representation needs to be consistent with an input sequence in length, so that the temporal encoder is more flexible.

103: Obtain a target sequence from a target database, and input the target sequence, the first encoding result, and the second encoding result into a decoder side of the sequence model.

In this embodiment of this application, the target database is obtained. The target database stores a plurality of target sequences required for being inputted into the sequence model. The target sequence may be used for training the sequence model. After a target sequence is obtained from the target database, the target sequence may be inputted into the decoder side of the sequence model. FIG. 2 is a schematic diagram of a composition structure of a sequence model according to an embodiment of this application. Decoding is performed by a decoding layer included in the decoder side. Descriptions are provided below by using an example in which the sequence model is a Transformer model. A Chinese word sequence may be inputted into the Transformer model, and an encoder side of the Transformer model may encode the Chinese word sequence. An English word sequence corresponding to the Chinese word sequence may be inputted into a decoder side of the Transformer model, to train the Transformer model by using the decoder side of the Transformer model, so that the Transformer model can be used for translation of Chinese and English word sequences.

In some embodiments of this application, FIG. 3 is a schematic diagram of a composition structure of another sequence model according to an embodiment of this application. The decoder side includes a decoding layer, the decoding layer including a self-attention network, an attention network, and a second feed-forward network. For example, the self-attention network may be a self-attention neural network. The self-attention neural network is a neural network structure model based on a self-attention mechanism. The second feed-forward network may be a basic neural network in which a parameter is unidirectionally propagated from an input layer to an output layer. For example, the second feed-forward network may be specifically a feed-forward neural network. The attention network is a neural network model that uses an attention mechanism, and in which input signals are represented as some hidden states. The attention mechanism is used for modeling a relationship between the hidden states.

In some embodiments of this application, the inputting the target sequence, the first encoding result, and the second encoding result into a decoder side of the sequence model in step 103 includes:

B1: inputting the target sequence into the self-attention network; and

B2: inputting the first encoding result and the second encoding result into the attention network.

The decoder side of the sequence model may include the self-attention network, the attention network, and the second feed-forward network. After the target sequence is obtained from the target database, the target sequence is inputted into the self-attention network for decoding. The encoder side of the sequence model outputs the first encoding result and the second encoding result, and the first encoding result and the second encoding result are inputted into the attention network for decoding. Calculation manners of the self-attention network and the attention network are described in detail in subsequent embodiments.

104: Decode the target sequence, the first encoding result, and the second encoding result by using the decoder side, and output a decoding result obtained after the decoding.

In this embodiment of this application, after the target sequence is inputted into the decoder side, the first encoding result and the second encoding result that are outputted by the encoder side are also inputted into the decoder side, and then, decoding may be performed by a decoder included in the decoder side. For example, the decoder side of the sequence model may include a plurality of decoding layers. The target sequence, the first encoding result, and the second encoding result are sequentially decoded by using the plurality of decoding layers, to obtain the decoding result. Respective decoding of the target sequence, the first encoding result, and the second encoding result by the plurality of decoding layers may be performed in parallel. In addition, decoding manners respectively used by the plurality of decoding layers for the target sequence, the first encoding result, and the second encoding result may be determined by machine learning network models used by the decoding layers.

Descriptions are provided below by using an example in which the sequence model is a Transformer model. A Chinese word sequence may be inputted into an encoder side of the Transformer model, and an English word sequence corresponding to the Chinese word sequence may be inputted into a decoder side of the Transformer model, to train the Transformer model by using the decoder side of the Transformer model, so that the Transformer model can be used for translation of Chinese and English word sequences. An output of the Transformer model may be a corresponding English word sequence.

In some embodiments of this application, in the implementation scenario of performing steps B1 and B2, the decoding the target sequence, the first encoding result, and the second encoding result by using the decoder side in step 104 includes:

C1: performing sequence transformation on the target sequence by using the self-attention network, to obtain a first query key-value pair sequence;

C2: inputting the first query key-value pair sequence into the attention network, and performing relationship modeling on the first query key-value pair sequence, the first encoding result, and the second encoding result by using the attention network, to obtain relationship information; and C3: unidirectionally propagating the relationship information by using the second feed-forward network, to obtain the decoding result.

Sequence transformation is performed on the target sequence by using the self-attention network. A learnable parameter matrix is set in the self-attention network. The learnable parameter matrix indicates that a parameter in the self-attention network is continuously updated at a model training stage. The self-attention network may include n layers of networks. An output of an $(n-1)^{th}$ layer is used as an input of an $n^{th}$ layer, and is linearly transformed by three different learnable parameter matrices into a query-key-value vector sequence. The vector sequence obtained through linear transformation may be referred to as a first query key-value pair sequence. Next, the first query key-value pair sequence is inputted into the attention network. As can be learned from the description of step B2 in the foregoing embodiment, the first encoding result and the second encoding result are inputted into the attention network. Therefore, the following three types of data may be inputted into the attention network: the first query key-value pair sequence, the first encoding result, and the second encoding result. Next, relationship modeling is performed on the first query key-value pair sequence, the first encoding result, and the second encoding result by using the attention network, to obtain the relationship information. For a modeling manner of the relationship information, detailed calculation descriptions are provided in subsequent embodiments. After the attention network outputs the relationship information, the relationship information may be unidirectionally propagated by using the second feed-forward network, to output the decoding result. A calculation manner of the second feed-forward network is described in detail in subsequent embodiments.

Figure 5:
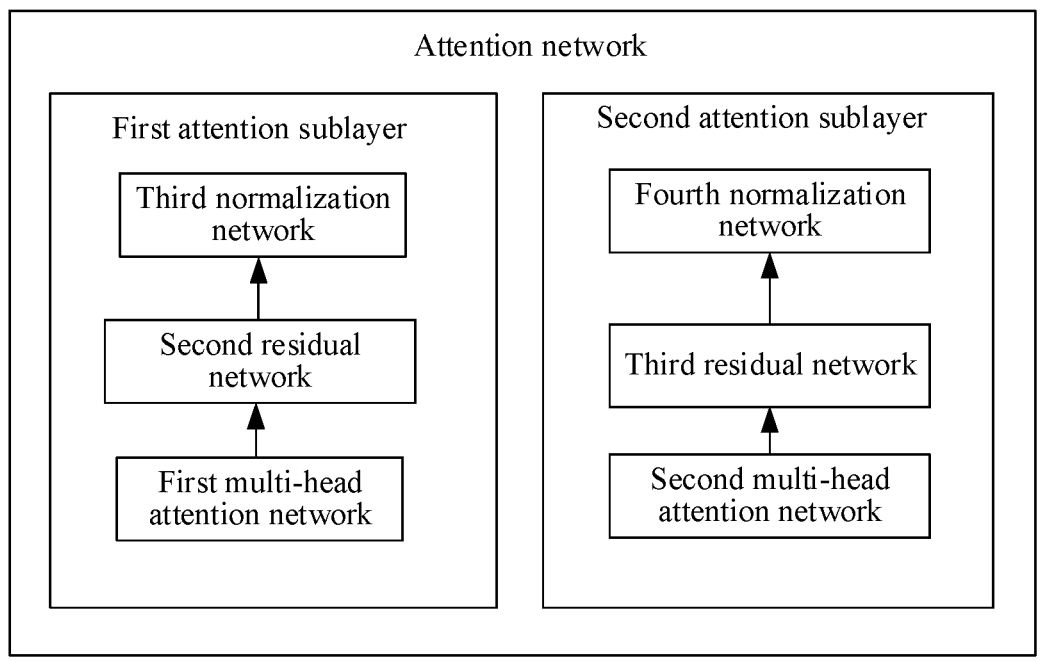
FIG. 5 is a schematic diagram of a composition structure of an attention network according to an embodiment of this application.

In some embodiments of this application, FIG. 5 is a schematic diagram of a composition structure of an attention network according to an embodiment of this application. The attention network includes a first attention sublayer and a second attention sublayer. The first encoding result is inputted into the first attention sublayer, and the second encoding result is inputted into the second attention sublayer. The attention network in the decoding layer may include two attention sublayers. The encoder side of the sequence model outputs the first encoding result and the second encoding result. If the two encoding results are simultaneously inputted into the two attention sublayers, decoding may be performed by using the two attention sublayers separately, and when each attention sublayer outputs a result, a final result is obtained through fusion, so that the relationship information may be generated through simultaneous decoding by the two attention sublayers. Because the two attention sublayers decode simultaneously, and then the output results are fused, such a manner may also be referred to as a gated sum manner in subsequent embodiments.

For example, in the attention network shown in FIG. 5, the first attention sublayer includes a first multi-head attention network, a second residual network, and a third normalization network. The second attention sublayer includes a second multi-head attention network, a third residual network, and a fourth normalization network.

In some embodiments of this application, based on the attention network shown in FIG. 5, the performing relationship modeling on the first query key-value pair sequence, the first encoding result, and the second encoding result by using the attention network in step C2 includes:

C21: separately inputting the first query key-value pair sequence into the first attention sublayer and the second attention sublayer;

C22: performing relationship modeling on the first query key-value pair sequence and the first encoding result by using the first multi-head attention network, to obtain first relationship sub-information, performing residual calculation on the first relationship sub-information by using the second residual network, and performing, by using the third normalization network, normalization transformation on a result obtained through residual calculation, to obtain an output result of the first attention sublayer;

C23: performing relationship modeling on the first query key-value pair sequence and the second encoding result by using the second multi-head attention network, to obtain second relationship sub-information, performing residual calculation on the second relationship sub-information by using the third residual network, and performing, by using the fourth normalization network, normalization transformation on a result obtained through residual calculation, to obtain an output result of the second attention sublayer; and C24: performing fusion calculation on the output result of the first attention sublayer and the output result of the second attention sublayer, to obtain the relationship information.

Optionally, each attention sublayer is provided with a multi-head attention network, a residual network, and a normalization network. Reference may be made to descriptions in the foregoing embodiments for the functions of the residual network and the normalization network. In each attention sublayer, relationship modeling may be performed on the first query key-value pair sequence and the encoding result by using the multi-head attention network, then the residual network and the normalization network are used for processing, and when each attention sublayer outputs a result, a final result is obtained through fusion, so that the relationship information may be generated through simultaneous decoding by the two attention sublayers.

For example, after the temporal encoder outputs the first encoding result, in an $n^{th}$ layer of the decoder, the attention network is constructed by using the first encoding result as a memory vector, and the first query key-value pair sequence outputted by the self-attention network as a query, to represent an output of the attention network corresponding to an output representation of the temporal encoder. To combine the output result of the first attention sublayer and the output result of the second attention sublayer, a weight is calculated by using a sigmoid non-linear function of logistic regression, and then the outputs of the two attention sublayers may be combined by using the weight.

In some embodiments of this application, FIG. 5 is a schematic diagram of a composition structure of an attention network according to an embodiment of this application. The attention network includes a first attention sublayer and a second attention sublayer. The first encoding result is inputted into the first attention sublayer, and the second encoding result is inputted into the second attention sublayer. The attention network in the decoding layer may include two attention sublayers. The encoder side of the sequence model outputs the first encoding result and the second encoding result. If the second encoding result is first inputted into the second attention sublayer for decoding and an output result of the second attention sublayer is inputted into the first attention sublayer, the first attention sublayer then decodes the first encoding result, and therefore, decoding may be sequentially performed by using the two attention sublayers. After the second attention sublayer outputs a result, the first attention sublayer outputs a result, so that the relationship information may be generated through sequential decoding by the two attention sublayers. Because of the sequential decoding by the two attention sublayers, such a manner may also be referred to as a cascade manner in subsequent embodiments.

For example, in the attention network shown in FIG. 5, the first attention sublayer includes a first multi-head attention network, a second residual network, and a third normalization network. The second attention sublayer includes a second multi-head attention network, a third residual network, and a fourth normalization network.

In some embodiments of this application, based on the attention network shown in FIG. 5, the performing relationship modeling on the first query key-value pair sequence, the first encoding result, and the second encoding result by using the attention network in step C2 includes:

C25: inputting the first query key-value pair sequence into the second attention sublayer;

C26: performing relationship modeling on the first query key-value pair sequence and the second encoding result by using the second multi-head attention network, to obtain third relationship sub-information, performing residual calculation on the third relationship sub-information by using the third residual network, and performing, by using the fourth normalization network, normalization transformation on a result obtained through residual calculation, to obtain an output result of a third attention sublayer; and C27: inputting the output result of the third attention sublayer into the first attention sublayer, performing relationship modeling on the output result of the third attention sublayer and the first encoding result by using the first multi-head attention network, to obtain fourth relationship sub-information, performing residual calculation on the fourth relationship sub-information by using the second residual network, and performing, by using the third normalization network, normalization transformation on a result obtained through residual calculation, to obtain the relationship information.

Each attention sublayer is provided with a multi-head attention network, a residual network, and a normalization network. Reference may be made to descriptions in the foregoing embodiments for the functions of the residual network and the normalization network. In the second attention sublayer, relationship modeling may be performed on the first query key-value pair sequence and the second encoding result by using the multi-head attention network, and then the residual network and the normalization network are used for processing. If the second encoding result is first inputted into the second attention sublayer for decoding and an output result of the second attention sublayer is inputted into the first attention sublayer, the first attention sublayer then decodes the first encoding result, and therefore, decoding may be sequentially performed by using the two attention sublayers. After the second attention sublayer outputs a result, the first attention sublayer outputs a result, so that the relationship information may be generated through sequential decoding by the two attention sublayers.

For example, after the temporal encoder outputs the first encoding result, in an $n^{th}$ layer of the decoder, the attention network is constructed by using the first encoding result as a memory vector, and the output result of the third attention sublayer outputted by the second attention sublayer in the attention network as a query, and is then fed to a feed-forward neural network, to obtain an output of the $n^{th}$ layer of the decoder.

In some embodiments of this application, the decoder side includes M decoding layers, M being a positive integer. Only the second encoding result is inputted into the first to the $(M-1)^{th}$ decoding layers of the decoder side, and the first encoding result is not inputted. The first encoding result and the second encoding result are inputted into the $M^{th}$ decoding layer of the decoder side.

The first encoding result outputted by the temporal encoder is not inputted into each decoding layer, and the second encoding result outputted by the self-attention encoder may be inputted into each decoding layer. Therefore, the first encoding result outputted by the temporal encoder has a short-path effect. In the temporal encoder, a layer of network is used for modeling, and only the last decoding layer of the decoder side of the sequence model is integrated with the first encoding result of the temporal encoder, so that a source input sequence more directly affects a target output sequence. Such a short-path method performs well in a machine translation task.

It can be learned from the descriptions of this embodiment of this application in the foregoing embodiments that, a sequence model has an encoder side and a decoder side. The encoder side includes a self-attention encoder and a temporal encoder. After a source sequence is obtained from a source database, the source sequence may be separately encoded by using the temporal encoder and the self-attention encoder. A first encoding result outputted by the temporal encoder includes time series information obtained by performing time series modeling on the source sequence, and the self-attention encoder outputs a second encoding result. On the decoder side of the sequence model, a target sequence, the first encoding result, and the second encoding result may be decoded, and a decoding result obtained after the decoding is outputted. In this embodiment of this application, because the self-attention encoder and the temporal encoder are used simultaneously on the encoder side of the sequence model, the time series information is also inputted into the decoder side of the sequence model for decoding. The sequence model provided in this embodiment of this application encodes the source sequence by using the foregoing two encoders simultaneously, to generate the time series information through time series modeling, so that the sequence model can accurately calculate a dependency relationship between sequence elements during task execution, thereby improving a task execution effect of the sequence model.

For better understanding and implementation of the foregoing solutions in the embodiments of this application, the following makes a specific description by using a corresponding application scenario as an example.

Figure 6:
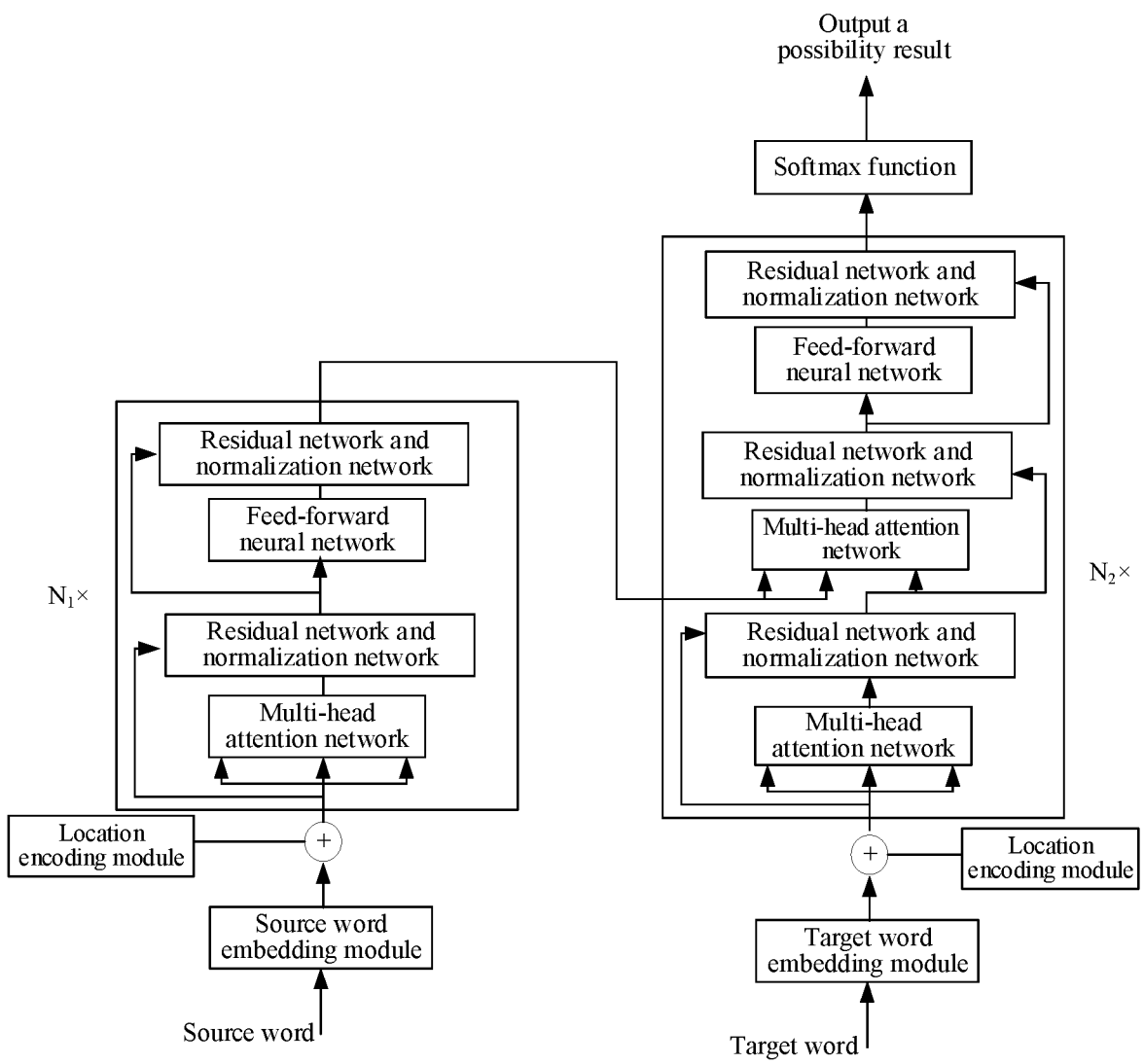
FIG. 6 is a schematic diagram of a basic architecture of a Transformer model according to an embodiment of this application.

FIG. 6 shows a basic structure of a Transformer model according to an embodiment of this application. The left part represents an encoder of the model, and the encoder includes N1 layers of networks. For example, N1 is set to 6, and each layer of network includes four sublayers. Each layer includes a layer of self-attention network and a layer of feed-forward network. First, a source word is inputted into a source word embedding module, then an output of a location encoding module and an output of the source word embedding module are added, and then an obtained sum is inputted into the encoder. The right part is a decoder that includes N2 layers of networks. For example, N2 is set to 6. Each layer includes a layer of self-attention network, a layer of attention network that uses a latent vector of the encoder as memory, and a layer of feed-forward network. A target word is inputted into a target word embedding module, then an output of a location encoding module and an output of the target word embedding module are added, and then an obtained sum is inputted into the decoder. In addition, each layer of network in the Transformer model uses a residual network and a normalization technology.

Next, functions of the network layers in the Transformer model are briefly described.

First, a source vector representation sequence is generated, an input sequence $x=\{x_1, \ldots x_I\}$ is given, and the first layer of the network converts the discrete elements into a continuous spatial representation (embedding).

For the self-attention network, an output of an $(n-1)^{th}$ layer is used as an input $H^{n-1}$ of the $n^{th}$ layer, and is first linearly transformed by three different learnable parameter matrices into a query-key-value vector sequence: Q, K, V. The learnable parameter matrix indicates that a parameter in the matrix is continuously updated at a model training stage:

$$\begin{bmatrix} Q \\ K \\ V \end{bmatrix} = H \begin{bmatrix} W_Q \\ W_K \\ W_V \end{bmatrix},$$

where $\{W_Q, W_K, W_V\}$ are all trainable parameter matrices of d×d, the three parameters are the learnable parameter matrices of the network, and the output of the $(n-1)^{th}$ layer is $H^{n-1}$. The SAN models a logical similarity e between the query and each key-value pair by using a dot product. Dot product modeling is to perform dot product multiplication on two matrices, to calculate a similarity between elements within the matrices.

$$e = \frac{Q \cdot K^T}{\sqrt{d}},$$

where $K^T$ represents transpose of the key matrix, and d is a dimension of a latent vector of the model. Then, the SAN performs non-linear transformation by using SoftMax, to convert the logical similarity into a weight relationship α between the query and each key-value pair:

$$\alpha = \text{softmax}(e)$$

According to the obtained weight, an output vector of a current element is obtained through weighted summation of each value. In actual calculation, dot product calculation is performed on the weight and the value:

$$SAN(H^{n-1}) = \alpha * v$$

where SAN represents a self-attention network, and may be considered as a function. $H^{n-1}$ is an input, and an output of the function is on the right of the equal sign.

For the attention neural network, an output of an $(n-1)^{th}$ layer is used as an input $H^{n-1}$ of the $n^{th}$ layer, and a memory vector H is given. $H^{n-1}$ is transformed by a learnable parameter matrix into a query, and H is transformed into a key and a value by two different matrices. The following operations are similar to that of the self-attention network, and is represented by ATT( ). Q, K, V in the self-attention network are transformed from the same vector $H^{n-1}$. However, K and V in the attention network are transformed from the memory vector H. The self-attention network is a special form of the attention network.

For the feed-forward neural network, linear transformation is first performed on an output $C^n$ of a first sublayer by a learnable parameter matrix $W_i$ (with a dimension of $d_{mod\_e1}$), then a learnable deviation $b_1$ is added, and then non-linear transformation is performed by using max, where max(,) indicates that a greater one of two values is taken. Linear transformation is then performed on a result of the non-linear transformation again by a learnable parameter matrix $W_2$ (with a dimension of $d_{ff}$), and then a learnable deviation $b_2$ is added. The process is represented by using the following formula:

$$FFN(C^n) = \max(0, C^n W + b_1) W_2 + b_2.$$

Next, the normalization technology is described. Layer norm indicates that values in a matrix are converted into values whose average value is 0 and whose variance is 1, and the operation is represented by LN( ).

For the residual network, the following calculation formula may be used: y=f(x)+x, where f(x) represents a layer of neural network, and x is an input of this layer of network. No additional parameter or calculation complexity are introduced into the residual network. A function of the residual network is to avoid disappearance of a gradient, and thus a deeper network can be trained.

An architecture of the Transformer model is as follows:
encoder side (encoder):

$$C_e^n = LN(SAN(H_e^{n-1}) + H_e^{n-1}),$$

$$H_e^n = LN(FFN(C_e^n) + C_e^n)$$

Each layer of the encoder side includes two sublayers. The first sublayer is a self-attention network, and the second sublayer is a feed-forward network. n represents a layer number, and the subscript e represents the encoder side.

decoder side (decoder):

$$C_d^n = LN(SAN(H_d^{-1}) + H_d^{n-1}),$$

$$D_d^n = LN(ATT(C_d^n, H_e^n) + C_d^n),$$

$$H_d^n = LN(FFN(D_d^n) + D_d^n)$$

Each layer of the decoder side includes three sublayers. The first sublayer is a self-attention network, the second sublayer is an attention neural network that uses an output of the encoder side as memory and an output of the self-attention network as a query, and the third sublayer is a feed-forward network. $D_d^n$ represents an output of the attention network layer. The subscript d represents the decoder side.

The Transformer model calculates a dependency relationship between sequence elements merely depending on the SAN, and lacks in modeling of time series information, which affects the translation quality. In this embodiment of this application, time series information may be modeled for the Transformer model. An additional recurrent network structure is introduced to model time series information of a sequence, to improve the performance of a translation system.

Based on the above, it is very important to research and develop a system that models time series information for the Transformer model. The simplicity and parallelizability of the Transformer model are retained, and an additional network may be introduced to model time series information, where the network may be another network, for example, a CNN. However, in this embodiment of this application, a temporal encoder and an existing self-attention encoder in the Transformer model are integrated mainly by using a recurrent network, which can overcome the disadvantages of the Transformer model. In particular, with the Transformer model being widely applied to an increasing quantity of tasks, it is an inevitable issue that the Transformer model will face.

In this embodiment of this application, a simple and flexible neural machine translation framework is provided. An additional encoder (that is, a temporal encoder, also referred to as an additional encoder subsequently) for modeling time series information is used to supplement the Transformer model. For the encoder for modeling time series information, two types of neural networks are used: an RNN network and an ARN. In addition, in this embodiment of this application, two manners are provided. Information of the additional temporal encoder is fed to the decoder side. In the last layer of the encoder of the Transformer model, the following two manners are used: a gated sum manner and a cascade manner. The information encoded by the additional temporal encoder is introduced into the Transformer model. The method used in this embodiment of this application is simple and flexible, and may be adapted to a plurality of types of additional encoders. In addition, a relatively small number of parameters are added. That is, a specific model of the additional encoder may be very flexible, for example, may be an ARN or an RNN.

Because the model framework provided in this application is simple and flexible, the temporal encoder may access a plurality of types of networks. The sequence model provided in this embodiment of this application has two encoders, one is a self-attention encoder of the Transformer model that is based on a SAN, and the other one is a temporal encoder (that is, an additional encoder). The original encoder is enhanced or modified. For example, in a machine translation task, the ARN provided in this application can significantly improve the translation quality, and can capture more syntaxes and time series information.

First, an encoder for modeling time series information is constructed based on the Transformer model. In this embodiment of this application, two types of models are used, the first type is an RNN network, and the second type is an attentive RNN. In this embodiment of this application, two manners of transmitting output information of the temporal encoder to the decoder of the Transformer model are provided: the first one is a gated sum manner, and the second one is a cascade manner. In addition, a "short-path" method is provided. That is, the output information of the additional encoder is merely introduced to the last layer of network of the decoder side. The short-path manner can first reduce a large quantity of parameters, so that the training speed is higher. Moreover, an output end can be more directly affected, so that the translation effect is better.

Figure 7:
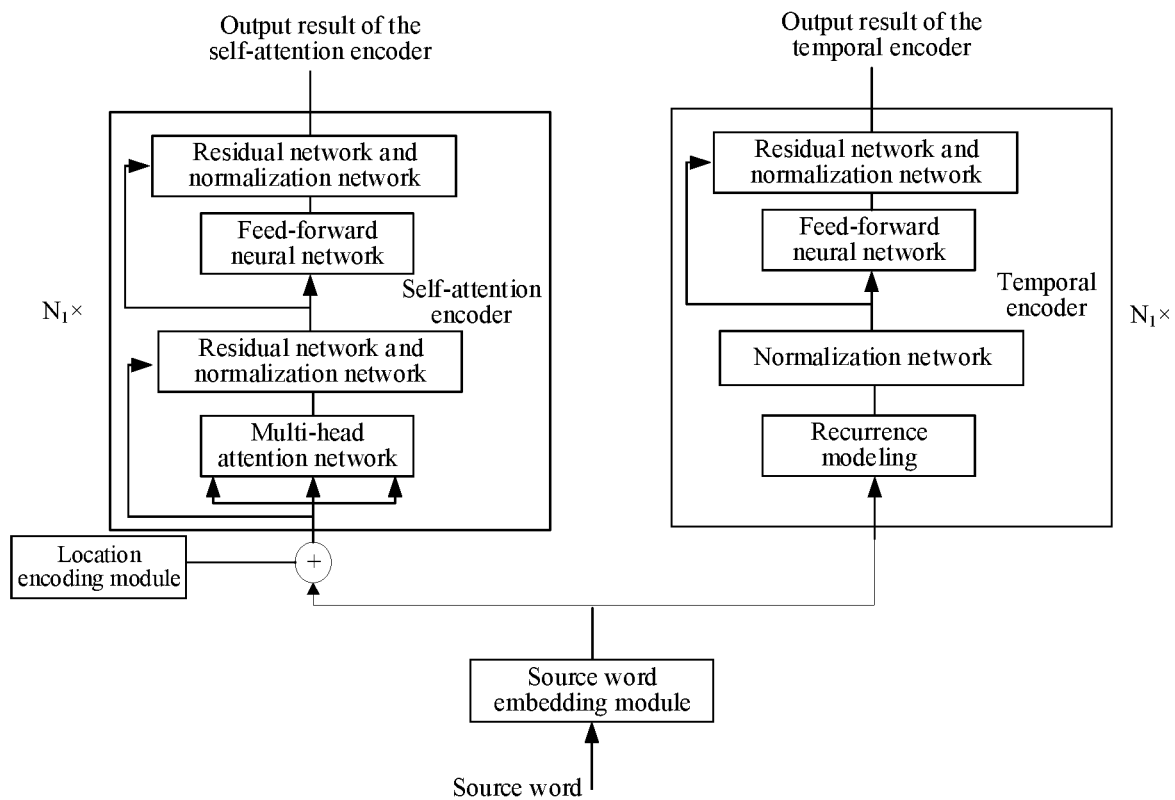
FIG. 7 is a schematic diagram of a self-attention encoder and a temporal encoder of a Transformer model according to an embodiment of this application.

In this embodiment of this application, the temporal encoder and the self-attention encoder are separately described below. FIG. 7 is a schematic diagram of a self-attention encoder and a temporal encoder of a Transformer model according to an embodiment of this application. The encoder side of the Transformer model has two types of encoders: the self-attention encoder shown on the left in FIG. 7 and the temporal encoder shown on the right in FIG. 7. First, a source word is inputted into a source word embedding module, then an output of a location encoding module and an output of the source word embedding module are added, and then an obtained sum is inputted into the self-attention encoder. The output of the source word embedding module is also inputted into the temporal encoder. The self-attention encoder includes the following four layers: a multi-head attention network, a residual network and a normalization network, a feed-forward neural network, and a residual network and a normalization network. The temporal encoder includes the following four layers: recurrence modeling, a normalization network, a feed-forward neural network, and a residual network and a normalization network.

As shown in FIG. 7, the encoder provided in this embodiment of this application includes two parts. The left part is a Transformer encoder, and the Transformer encoder is based on a SAN. The right part is an encoder (that is, the temporal encoder) for modeling time series information provided in this embodiment of this application. The encoder for modeling time series information has the same quantity of layers as that of the encoder of the Transformer model. Each layer includes two sublayers, which are respectively a time series information network and a feed-forward network. A core component of the time series information network is recurrence modeling.

The time series information network may be represented by using the following formula:

$$C_r^n = LN(REC(H_r^{n-1}) + H_r^{n-1}),$$

$$H_r^n = LN(FFN(C_r^n) + C_r^n)$$

RECD($\cdot$) represents a function of a time series model. In this embodiment of this application, no residual network is used in the first layer of network (that is, N=1). An objective of this manner is to eliminate a restriction that a latent vector representation needs to be consistent with an input sequence in length, so that the encoder for modeling time series information provided in this embodiment of this application is more flexible. The subscript r represents the time series information network.

Figure 8:
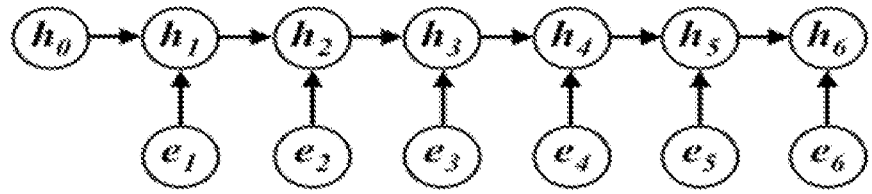
FIG. 8 is a schematic diagram of an RNN according to an embodiment of this application.

FIG. 8 is a schematic diagram of an RNN according to an embodiment of this application. h0 represents a latent vector of a node, e1 represents an input of the node. h being connected represents that the latent vector is continuously transmitted backward. For a source vector representation sequence, an input sequence $H_{RNN}^0 = \{h_1^0, \ldots h_J^0\}$ given, which is a vector representation of the input sequence. $h_J^0$ represents a $J^{th}$ latent vector of the $0^{th}$ layer.

For a bidirectional RNN network, the bidirectional RNN models time series information in the following manner:

$$h_j^n = [\vec{h}_j; \cev{h}_j],$$

$$\vec{h}_j = \vec{f}(\vec{h}_{j-1}, h_j^{n-1}),$$

$$\cev{h}_j = \cev{f}(\cev{h}_{j+1}, h_j^{n-1}).$$

$\vec{f}(\vec{h}_{j-1}, h_j^{n-1})$ and $\cev{f}(\cev{h}_{j+1}, h_j^{n-1})$ respectively represent activation functions of a forward RNN network and a reverse RNN network. The foregoing three steps are repeated, to obtain an RNN output representation that is stacked by a plurality of layers.

$$H_{RNN}^n = \{h_1^n, \ldots, h_J^n\}$$

For a feed-forward neural network, the output representation of the bidirectional RNN is fed to the feed-forward neural network, to obtain a final output representation $H_r^N$ of an encoder based on the RNN.

Figure 9:
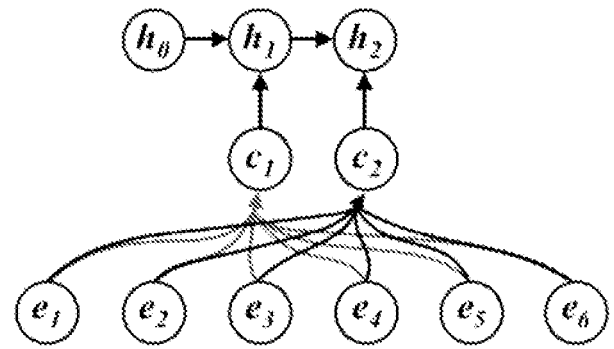
FIG. 9 is a schematic diagram of an attentive recurrent network (ARN) according to an embodiment of this application.

FIG. 9 is a schematic diagram of an ARN according to an embodiment of this application. h0 represents a latent vector of a node, e1 represents an input of the node. C1 and C2 represent outputs of an attention model. For a source vector representation sequence, an input sequence $H_{ARN}^0 = \{h_1^0, \ldots, h_J^0\}$ is given, which is a vector representation of the input sequence.

The ARN provided in this embodiment of this application can learn a compact, global feature representation for an input sequence. Specifically, in each step of the recurrent network, calculation is performed by using the following formula:

$$h_t^n = f(h_{t-1}^n, c_t^n),$$

$$c_t^n = ATT(h_{t-1}^n, H_r^{n-1})$$

The subscript t is a moment corresponding to each step. After T steps of recurrence, an output $H_{ARN}^n = \{h_1^n, \ldots h_T^n\}$ of the ARN may be obtained.

Further, the ARN provided in this embodiment of this application may be a bidirectional ARN.

For a feed-forward neural network, the output representation of the ARN is fed to the feed-forward neural network, to obtain a final output representation $H_r^N$ of an encoder based on the ARN.

Figure 10:
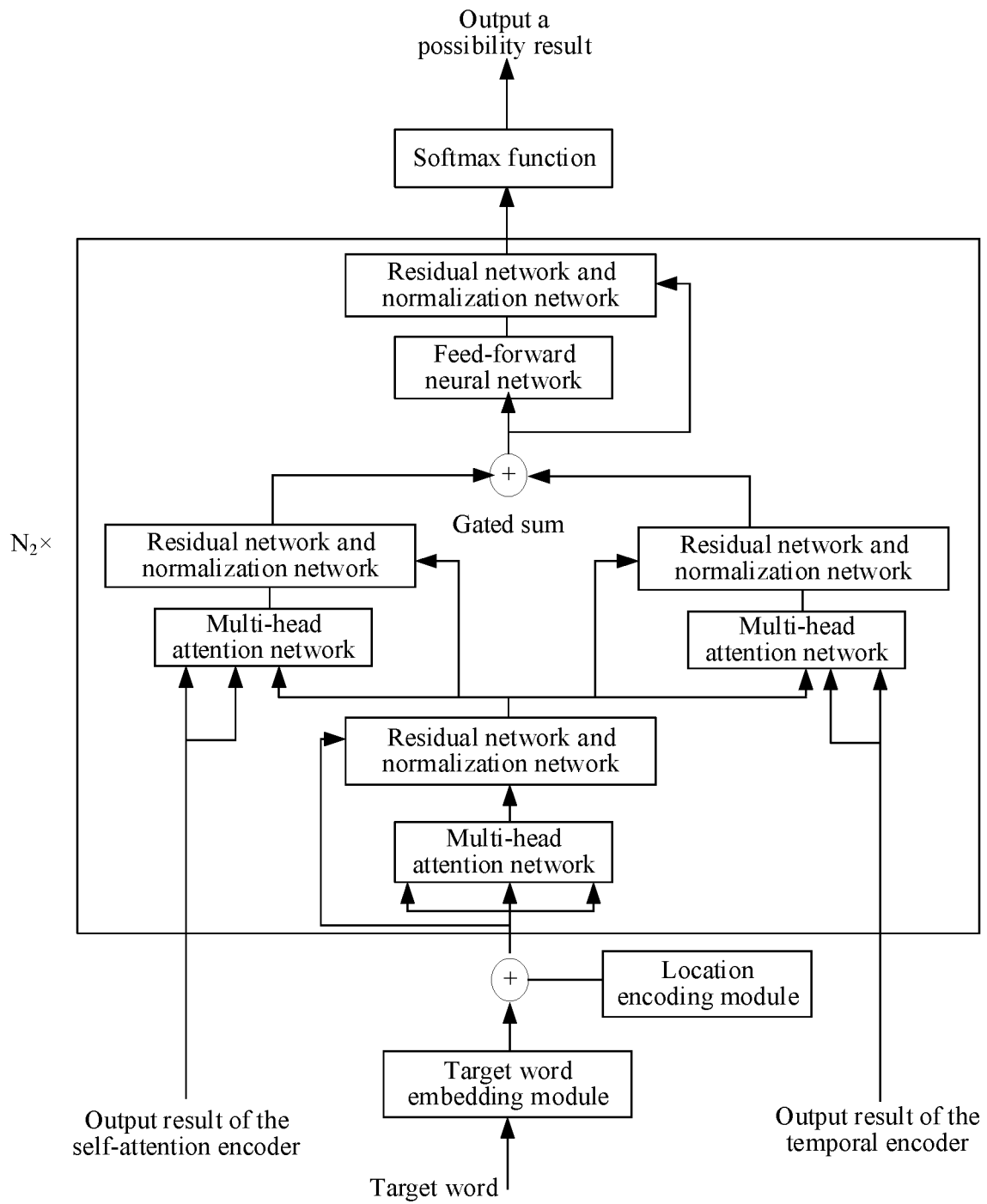
FIG. 10 is a schematic diagram of decoding in a gated sum manner according to an embodiment of this application.

After the self-attention encoder and the temporal encoder separately completes encoding, the output result of the self-attention encoder and the output result of the temporal encoder may be integrated. FIG. 10 is a schematic diagram of decoding in a gated sum manner according to an embodiment of this application. A target word is inputted into a target word embedding module, then an output of a location encoding module and an output of the target word embedding module are added, and then an obtained sum is inputted into a multi-head attention network, a residual network, and a normalization network for decoding. An obtained decoding result is separately decoded together with the output result of the self-attention encoder, and the output result of the temporal encoder. Then gated summation is performed on respective decoding results, an obtained result is inputted into a feed-forward neural network, a residual network, and a normalization network for processing, and finally a possibility result is outputted through a Softmax function.

The gated sum manner is described in detail below. After the representation $H_r^n$ of the additional encoder for modeling time series information is obtained, in an $n^{th}$ layer of the decoder, an attention network is constructed by using $H_r^n$ as memory and an output $C_d^n$ of a self-attention network as a query:

$$R_d^n = LN(ATT(c_d^n, H_r^n) + c_d^n)$$

where $R_d^n$ represents an output of an attention network corresponding to an output representation of the additional encoder for modeling time series information. To combine the output and an original output $D_d^n$ in the network, a weight $\lambda_n$ is calculated by using a sigmoid non-linear function of logistic regression:

$$\lambda_n = \text{sigmoid}(D_d^n, R_d^n)$$

Then, the outputs of the two attention networks may be combined by using the weight:

$$\hat{D}_d^n = \lambda_n D_d^n + (1-\lambda_n) R_d^n,$$

and then fed to the feed-forward neural network: $H_d^n = LN$ (FFN $(\hat{D}_d^n) + \hat{D}_d^n$). Therefore, an output $H_d^n$ of the $n^{th}$ layer of the decoder is obtained. The subscript d represents the decoder side.

Figure 11:
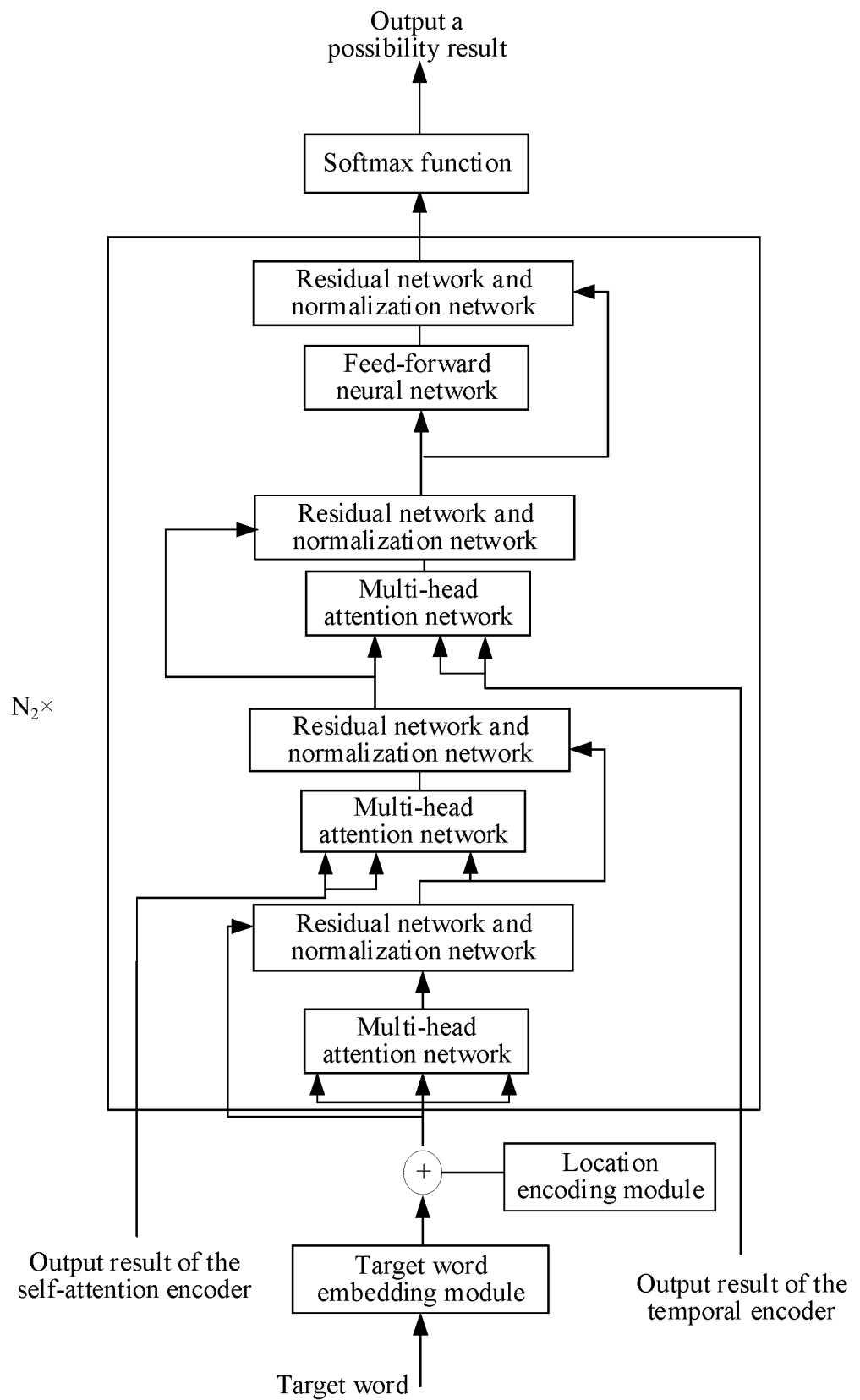
FIG. 11 is a schematic diagram of decoding in a cascade manner according to an embodiment of this application.

FIG. 11 is a schematic diagram of decoding in a cascade manner according to an embodiment of this application. A target word is inputted into a target word embedding module, then an output of a location encoding module and an output of the target word embedding module are added, and then an obtained sum is inputted into a multi-head attention network, a residual network, and a normalization network for decoding. An obtained decoding result and the output result of the self-attention encoder are decoded, then the obtained decoding result and the output result of the temporal encoder are jointly inputted into a multi-head attention network, a residual network, and a normalization network. A result obtained through decoding is inputted into a feed-forward neural network, a residual network, and a normalization network for processing, and finally a possibility result is outputted through a Softmax function.

The cascade manner is described in detail below. After the representation $H_r^n$ of the additional encoder for modeling time series information is obtained, in an $n^{th}$ layer of the decoder, an attention network is constructed by using $H_r^n$ as memory and an output $D_d^n$ of the attention network as a query. The attention network constructed herein is an attention network constructed by using the output of the attention network of the decoder as a query and the output of the temporal encoder as a key, and an objective is to connect the temporal encoder and the decoder. This may be specifically implemented in the following manner:

$$R_d^n = LN(ATT(D_d^n, H_r^n) + D_d^n)$$

where $R_d^n$ represents an output of an attention network corresponding to an output representation of the additional encoder for modeling time series information, and is then fed to the feed-forward neural network:

$$H_d^n = LN(FFN(R_d^n) + R_d^n).$$

Therefore, an output $H_d^n$ of the $n^{th}$ layer of the decoder is obtained.

In this embodiment of this application, a short-path method is provided. In the additional encoder for modeling time series information, a layer of network is used for modeling, and only the last layer of the decoder of the Transformer model is integrated with the information of the additional encoder, so that a source input sequence more directly affects a target output sequence. Such a short-path method performs well in a machine translation task.

A plurality of model combination manners used in this embodiment of this application are described below by using examples.

Method 1: Six layers of bidirectional RNN networks are used in the additional encoder for modeling time series information, a short path is used on the decoder side of the Transformer model, and the cascade manner is integrated with the short-path manner directly in the last layer of the decoder side. The six layers refers to the encoder for modeling time series information.

Method 2: One layer of bidirectional ARN is used in the additional encoder for modeling time series information, a short path is used on the decoder side of the Transformer model, and the gated sum manner is integrated with the short-path manner directly in the last layer of the decoder side. The bidirectional ARN reverses an input sequence, then performs modeling again by using the ARN, and splices the forward output and the reverse output.

Method 3: One layer of bidirectional ARN is used in the additional encoder for modeling time series information, a short path is used on the decoder side of the Transformer model, and the cascade manner is integrated with the short-path manner directly in the last layer of the decoder side.

Because the method provided in this embodiment of this application is simple and flexible, various modified network structures may be added to the temporal encoder, to improve the translation effect of the Transformer model. In addition, in other language understanding and generation tasks, a simple and effective method is provided in this embodiment of this application to provide additional encoding information for the sequence model.

Machine translation is used as an example. In the WMT2014 English-German machine translation task test, the provided method significantly improves the translation quality. As shown in the following Table 1, bilingual evaluation understudy (BLEU) is a standard method for machine translation evaluation, and a larger value indicates a better effect. An increase of more than 0.5 points in BLEU generally indicates a significant improvement. The column named Δ represents an absolute value of an increase. The unit of a quantity of parameters is million (M), and the unit of a training speed is a quantity of iterations per second. The method provided in this embodiment of this application performs well in translation of relatively long sentences.

Table 1 is a comparison table of the effects of the transformer model provided in this embodiment of this application and a network model in the related art on a machine translation system.

TABLE 1

| | | Translation effect | | Computing resources | |
|---|---|---|---|---|---|
| Model | | BLEU | Δ | Quantity of parameters | Training speed |
| Reference | Related art | 27.64 | — | 88.0M | 1.28 |
| This | Method 1 | 27.84 | +0.20 | 113.2M | 1.10 |
| embodiment | Method 2 | 28.42 | +0.78 | 97.5M | 1.25 |
| of this application | Method 3 | 28.49 | +0.85 | 97.4M | 1.24 |

A manner of encoding the time series information is not limited in this application. A plurality of layers of unidirectional RNNs, ARNs, or other network mechanisms may be used in the time series information encoder side. For example, a directional self-attention network may be used. In this application, a coefficient of the time series information encoder side is calculated by using a sigmoid non-linear method, so that the coefficient becomes a scalar with a value range of (0, 1). The step may be replaced with another method in which any real number can be mapped to (0, 1).

In this embodiment of this application, time series information modeling is performed on the Transformer model, to enhance the time series information representation of the source sequence. In this embodiment of this application, a short-path manner is used. A feature of the short-path manner is that the output of the encoder for modeling time series information is directly integrated in the last layer of the decoder side. Time series information of a sequence is modeled by using a bidirectional ARN. On the encoder side for modeling time series information, a source sequence is modeled by using a bidirectional ARN. Information of the encoder side is integrated on the decoder side in a gated sum manner or a cascade manner. The gated sum manner or the cascade manner is used in a single layer or a plurality of layers of the decoder side, and the output of the encoder side for modeling time series information is integrated on the decoder side. The method in this application may be applied to a plurality of types of sequence models without being limited to a machine translation system, to improve the time series modeling capability for a sequence. In the machine translation system Transformer, it has been verified that the translation quality of a translation task can be significantly improved, thereby improving user experience.

The main innovation of this application is to provide a time series information modeling method for a neural machine translation Transformer model. Time series information modeling is performed on a source sequence by using an additional encoder, and then two integration manners (where the first manner is a gated sum manner, and the second manner is a cascade manner) are provided, to integrate information learned by the encoder with the original Transformer model. Further, this application provides a short-path effect, to efficiently transmit information of the source sequence to a target sequence.

For ease of description, the foregoing method embodiments are stated as a series of action combinations. However, a person skilled in the art is to know that this application is not limited to the described sequence of the actions because according to this application, some steps may use another sequence or may be simultaneously performed. In addition, a person skilled in the art is further to understand that the embodiments described in this specification are exemplary embodiments, and the involved actions and modules are not necessarily required by this application.

To better implement the foregoing solutions in the embodiments of this application, related apparatuses for implementing the foregoing solutions are further provided below.

Figure 12:
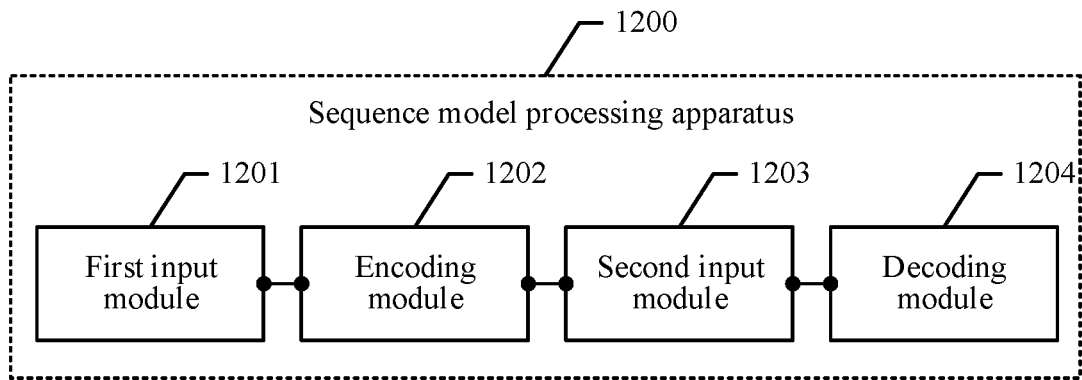
FIG. 12 is a schematic diagram of a composition structure of a sequence model processing apparatus according to an embodiment of this application.

Referring to FIG. 12, a sequence model processing apparatus 1200 provided in an embodiment of this application may include a first input module 1201, an encoding module 1202, a second input module 1203, and a decoding module 1204.

The first input module 1201 is configured to obtain a source sequence, and input the source sequence into an encoder side of a sequence model, the encoder side including a self-attention encoder and a temporal encoder.

The encoding module 1202 is configured to encode the source sequence by using the temporal encoder, to obtain a first encoding result, the first encoding result including time series information obtained by performing time series modeling on the source sequence; and encode the source sequence by using the self-attention encoder, to obtain a second encoding result.

The second input module 1203 is configured to obtain a target sequence, and input the target sequence, the first encoding result, and the second encoding result into a decoder side of the sequence model.

The decoding module 1204 is configured to decode the target sequence, the first encoding result, and the second encoding result by using the decoder side, and output a decoding result obtained after the decoding.

In some embodiments of this application, the temporal encoder includes an encoding layer, the encoding layer including a time series information network and a first feed-forward network.

Figure 13:
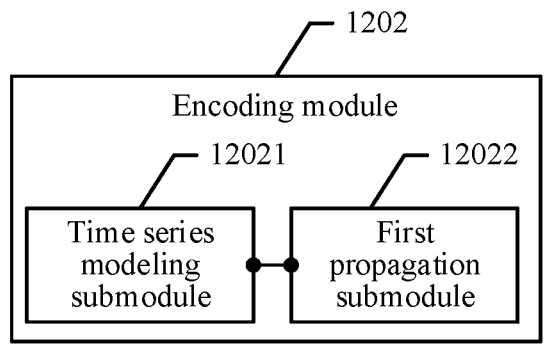
FIG. 13 is a schematic diagram of a composition structure of an encoding module according to an embodiment of this application.

As shown in FIG. 13, the encoding module 1202 includes:

a time series modeling submodule 12021, configured to perform time series modeling on the source sequence by using the time series information network, to obtain the time series information; and a first propagation submodule 12022, configured to unidirectionally propagate the time series information by using the first feed-forward network, and output the first encoding result.

In some embodiments of this application, the temporal encoder includes N encoding layers, N being a positive integer.

A first encoding layer in the temporal encoder includes a first time series information network and the first feed-forward network.

The first time series information network includes a first neural network and a first normalization network.

Figure 14:
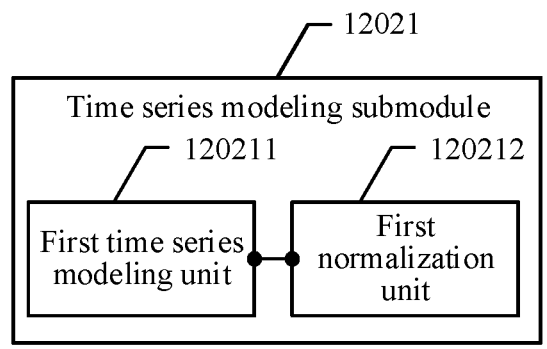
FIG. 14 is a schematic diagram of a composition structure of a time series modeling submodule according to an embodiment of this application.

As shown in FIG. 14, the time series modeling submodule 12021 includes:

a first time series modeling unit 120211, configured to perform time series modeling on the source sequence by using the first neural network; and a first normalization unit 120212, configured to perform, by using the first normalization network, normalization transformation on a result obtained through time series modeling, to obtain the time series information.

In some embodiments of this application, a second encoding layer in the temporal encoder includes a second time series information network and the first feed-forward network.

The second time series information network includes a second neural network, a first residual network, and a second normalization network.

Figure 15:
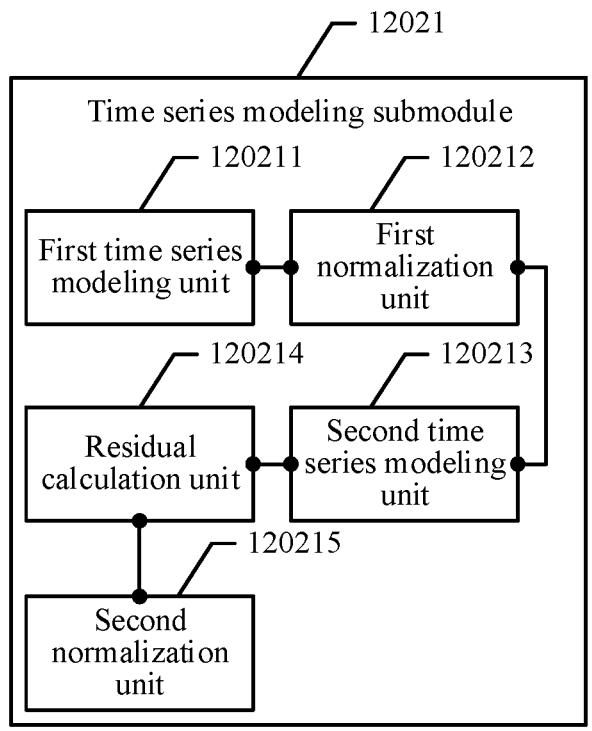
FIG. 15 is a schematic diagram of a composition structure of another time series modeling submodule according to an embodiment of this application.

As shown in FIG. 15, compared with FIG. 14, the time series modeling submodule 12021 further includes:

a second time series modeling unit 120213, configured to perform, after the first feed-forward network in the first encoding layer outputs a first sublayer encoding result, time series modeling on the first sublayer encoding result by using the second neural network;

a residual calculation unit 120214, configured to perform, by using the first residual network, residual calculation on a result obtained through time series modeling; and a second normalization unit 120215, configured to perform, by using the second normalization network, normalization transformation on a result obtained through residual calculation, to obtain the time series information.

In some embodiments of this application, the first neural network is a bidirectional neural network; or the first neural network is an RNN, or an ARN.

In some embodiments of this application, the second neural network is a bidirectional neural network; or the second neural network is an RNN, or an ARN.

In some embodiments of this application, the decoder side includes a decoding layer, the decoding layer including a self-attention network, an attention network, and a second feed-forward network.

The second input module 1203 is configured to input the target sequence into the self-attention network; and input the first encoding result and the second encoding result into the attention network.

Figure 16:
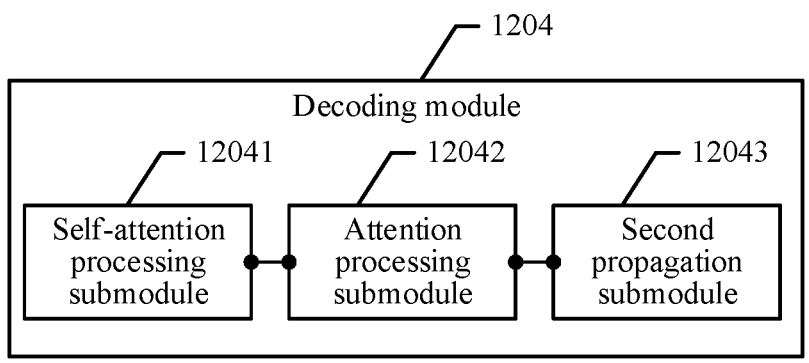
FIG. 16 is a schematic diagram of a composition structure of a decoding module according to an embodiment of this application.

In some embodiments of this application, as shown in FIG. 16, the decoding module 1204 includes:

a self-attention processing submodule 12041, configured to perform sequence transformation on the target sequence by using the self-attention network, to obtain a first query key-value pair sequence;

an attention processing submodule 12042, configured to input the first query key-value pair sequence into the attention network, and perform relationship modeling on the first query key-value pair sequence, the first encoding result, and the second encoding result by using the attention network, to obtain relationship information; and a second propagation submodule 12043, configured to unidirectionally propagate the relationship information by using the second feed-forward network, to obtain the decoding result.

In some embodiments of this application, the attention network includes a first attention sublayer and a second attention sublayer, the first encoding result is inputted into the first attention sublayer, and the second encoding result is inputted into the second attention sublayer.

The first attention sublayer includes a first multi-head attention network, a second residual network, and a third normalization network.

The second attention sublayer includes a second multi-head attention network, a third residual network, and a fourth normalization network.

Figure 17:
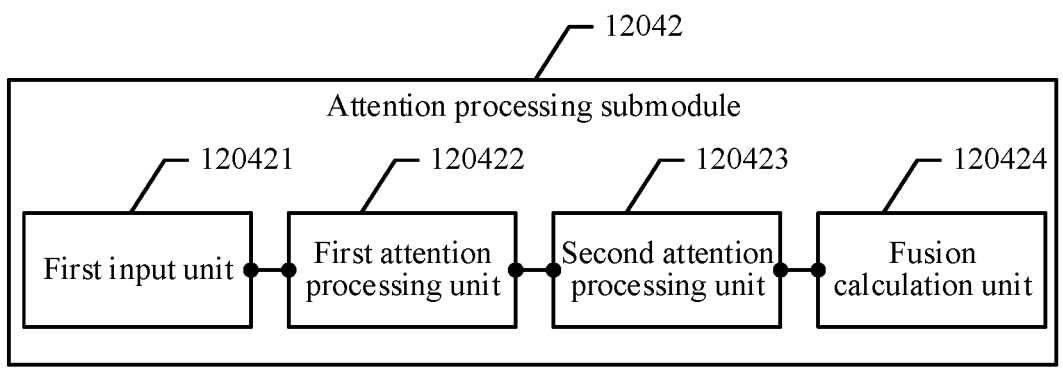
FIG. 17 is a schematic diagram of a composition structure of an attention processing submodule according to an embodiment of this application.

As shown in FIG. 17, the attention processing submodule 12042 includes:

a first input unit 120421, configured to separately input the first query key-value pair sequence into the first attention sublayer and the second attention sublayer;

a first attention processing unit 120422, configured to perform relationship modeling on the first query key-value pair sequence and the first encoding result by using the first multi-head attention network, to obtain first relationship sub-information, perform residual calculation on the first relationship sub-information by using the second residual network, and perform, by using the third normalization network, normalization transformation on a result obtained through residual calculation, to obtain an output result of the first attention sublayer;

a second attention processing unit 120423, configured to perform relationship modeling on the first query key-value pair sequence and the second encoding result by using the second multi-head attention network, to obtain second relationship sub-information, perform residual calculation on the second relationship sub-information by using the third residual network, and perform, by using the fourth normalization network, normalization transformation on a result obtained through residual calculation, to obtain an output result of the second attention sublayer; and a fusion calculation unit 120424, configured to perform fusion calculation on the output result of the first attention sublayer and the output result of the second attention sublayer, to obtain the relationship information.

In some embodiments of this application, the attention network includes a first attention sublayer and a second attention sublayer, the first encoding result is inputted into the first attention sublayer, and the second encoding result is inputted into the second attention sublayer.

The first attention sublayer includes a first multi-head attention network, a second residual network, and a third normalization network.

The second attention sublayer includes a second multi-head attention network, a third residual network, and a fourth normalization network.

Figure 18:
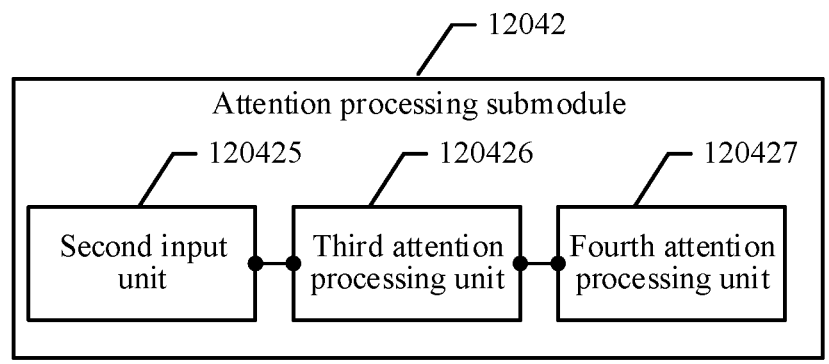
FIG. 18 is a schematic diagram of a composition structure of another attention processing submodule according to an embodiment of this application.

As shown in FIG. 18, the attention processing submodule 12042 includes:

a second input unit 120425, configured to input the first query key-value pair sequence into the second attention sublayer;

a third attention processing unit 120426, configured to perform relationship modeling on the first query key-value pair sequence and the second encoding result by using the second multi-head attention network, to obtain third relationship sub-information, perform residual calculation on the third relationship sub-information by using the third residual network, and perform, by using the fourth normalization network, normalization transformation on a result obtained through residual calculation, to obtain an output result of a third attention sublayer; and a fourth attention processing unit 120427, configured to input the output result of the third attention sublayer into the first attention sublayer, perform relationship modeling on the output result of the third attention sublayer and the first encoding result by using the first multi-head attention network, to obtain fourth relationship sub-information, perform residual calculation on the fourth relationship sub-information by using the second residual network, and perform, by using the third normalization network, normalization transformation on a result obtained through residual calculation, to obtain the relationship information.

In some embodiments of this application, the decoder side includes M decoding layers, M being a positive integer.

Only the second encoding result is inputted into the first to the $(M-1)^{th}$ decoding layers of the decoder side, and the first encoding result is not inputted.

The first encoding result and the second encoding result are inputted into the $M^{th}$ decoding layer of the decoder side.

It can be learned from the descriptions of this embodiment of this application that, a sequence model has an encoder side and a decoder side. The encoder side includes a self-attention encoder and a temporal encoder. After a source sequence is obtained from a source database, the source sequence may be separately encoded by using the temporal encoder and the self-attention encoder. A first encoding result outputted by the temporal encoder includes time series information obtained by performing time series modeling on the source sequence, and the self-attention encoder outputs a second encoding result. On the decoder side of the sequence model, a target sequence, the first encoding result, and the second encoding result may be decoded, and a decoding result obtained after the decoding is outputted. In this embodiment of this application, because the self-attention encoder and the temporal encoder are used simultaneously on the encoder side of the sequence model, the time series information is also inputted into the decoder side of the sequence model for decoding. The sequence model provided in this embodiment of this application encodes the source sequence by using the foregoing two encoders simultaneously, to generate the time series information through time series modeling, so that the sequence model can accurately calculate a dependency relationship between sequence elements during task execution, thereby improving a task execution effect of the sequence model.

Figure 19:
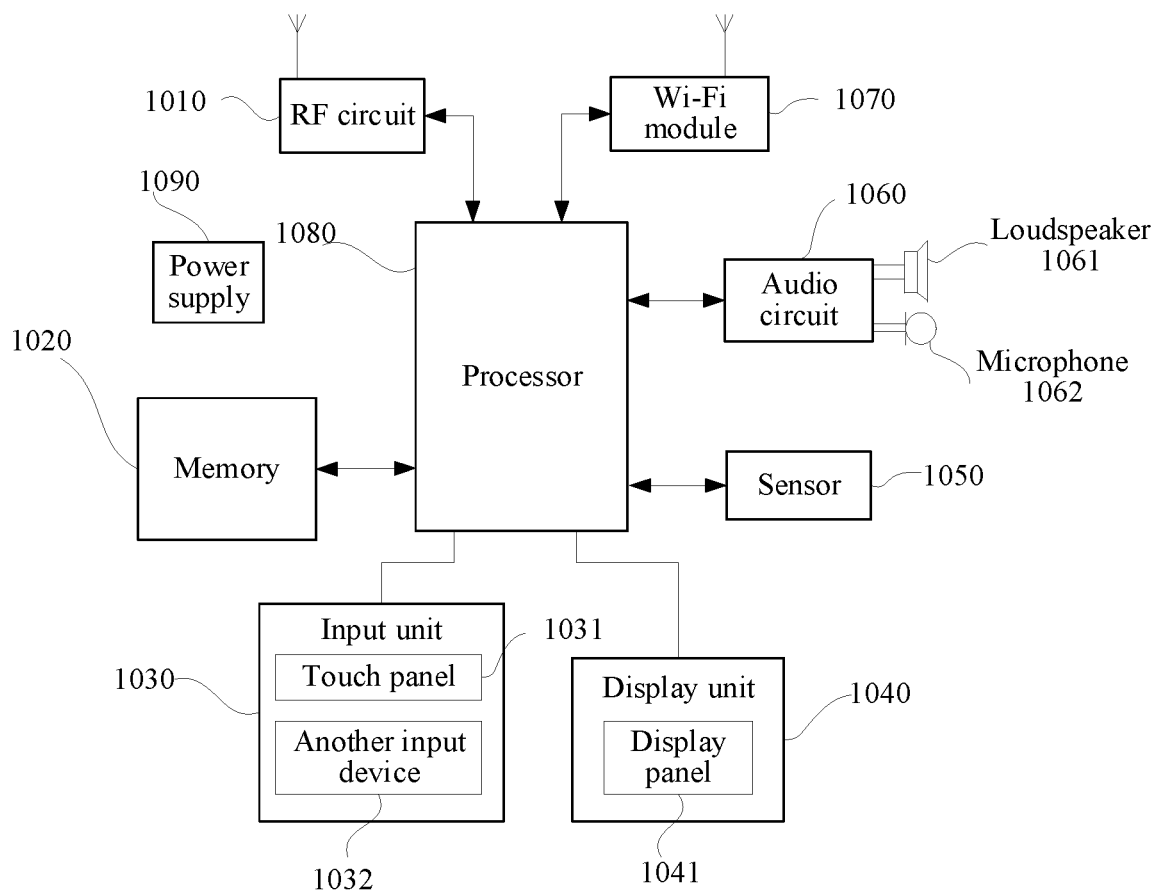
FIG. 19 is a schematic diagram of a composition structure of a terminal to which a sequence model processing method is applied according to an embodiment of this application.

An embodiment of this application further provides another terminal. As shown in FIG. 19, for ease of description, only parts related to the embodiments of this application are shown. For specific technical details that are not disclosed, refer to the method part in the embodiments of this application. The terminal may be any terminal device, including a mobile phone, a tablet computer, a personal digital assistant (PDA), a point of sales (POS), and an in-vehicle computer. For example, the terminal is a mobile phone.

FIG. 19 is a block diagram of a part of a structure of the mobile phone related to the terminal according to this embodiment of this application. Referring to FIG. 19, the mobile phone includes components such as a radio frequency (RF) circuit 1010, a memory 1020, an input unit 1030, a display unit 1040, a sensor 1050, an audio circuit 1060, a wireless fidelity (Wi-Fi) module 1070, a processor 1080, and a power supply 1090. A person skilled in the art may understand that the structure of the mobile phone shown in FIG. 19 does not constitute a limitation on the mobile phone, and the mobile phone may include more or fewer components than those shown in the figure, or some components may be combined, or a different component deployment may be used.

The following makes an exemplary description of the components of the mobile phone with reference to FIG. 19.

The RF circuit 1010 may be configured to receive and send signals during an information receiving and sending process or a call process. Specifically, the RF circuit 1010 receives downlink information from a base station, then delivers the downlink information to the processor 1080 for processing, and sends designed uplink data to the base station. Usually, the RF circuit 1010 includes, but is not limited to, an antenna, at least one amplifier, a transceiver, a coupler, a low noise amplifier (LNA), and a duplexer. In addition, the RF circuit 1010 may also communicate with a network and another device through wireless communication. The wireless communication may use any communication standard or protocol, including but not limited to Global System for Mobile Communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 1020 may be configured to store a software program and module. The processor 1080 runs the software program and module stored in the memory 1020, to implement various functional applications and data processing of the mobile phone. The memory 1020 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 1020 may include a high speed random access memory, and may further include a non-volatile memory, such as at least one magnetic disk storage device, a flash memory, or another volatile solid-state storage device.

The input unit 1030 may be configured to receive input digit or character information, and generate a keyboard signal input related to the user setting and function control of the mobile phone. Specifically, the input unit 1030 may include a touch panel 1031 and another input device 1032. The touch panel 1031, also referred to as a touchscreen, may collect a touch operation of a user on or near the touch panel (such as an operation of a user on or near the touch panel 1031 by using any suitable object or accessory such as a finger or a stylus), and drive a corresponding connection apparatus according to a preset program. Optionally, the touch panel 1031 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1080. Moreover, the touch controller can receive and execute a command sent from the processor 1080. In addition, the touch panel 1031 may be implemented by using various types, such as a resistive type, a capacitive type, an infrared type, and a surface acoustic wave type. In addition to the touch panel 1031, the input unit 1030 may further include the another input device 1032. Specifically, the another input device 1032 may include, but is not limited to, one or more of a physical keyboard, a functional key (such as a volume control key or a switch key), a track ball, a mouse, and a joystick.

The display unit 1040 may be configured to display information inputted by the user or information provided for the user, and various menus of the mobile phone. The display unit 1040 may include a display panel 1041. Optionally, the display panel 1041 may be configured by using a liquid crystal display (LCD), an organic light-emitting diode (OLED), or the like. Further, the touch panel 1031 may cover the display panel 1041. After detecting a touch operation on or near the touch panel 1031, the touch panel 1031 transfers the touch operation to the processor 1080, to determine a type of a touch event. Then, the processor 1080 provides a corresponding visual output on the display panel 1041 according to the type of the touch event. Although in FIG. 19, the touch panel 1031 and the display panel 1041 are used as two separate parts to implement input and output functions of the mobile phone, in some embodiments, the touch panel 1031 and the display panel 1041 may be integrated to implement the input and output functions of the mobile phone.

The mobile phone may further include at least one sensor 1050 such as an optical sensor, a motion sensor, and other sensors. Specifically, the optical sensor may include an ambient light sensor and a proximity sensor. The ambient light sensor may adjust luminance of the display panel 1041 according to brightness of the ambient light. The proximity sensor may switch off the display panel 1041 and/or backlight when the mobile phone is moved to the ear. As one type of motion sensor, an acceleration sensor can detect magnitude of accelerations in various directions (generally on three axes), may detect magnitude and a direction of the gravity when being static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1060, a loudspeaker 1061, and a microphone 1062 may provide audio interfaces between the user and the mobile phone. The audio circuit 1060 may convert received audio data into an electrical signal and transmit the electrical signal to the loudspeaker 1061. The loudspeaker 1061 converts the electrical signal into a sound signal for output. On the other hand, the microphone 1062 converts a collected sound signal into an electrical signal. The audio circuit 1060 receives the electrical signal, converts the electrical signal into audio data, and outputs the audio data to the processor 1080 for processing. Then, the processor 1080 sends the audio data to, for example, another mobile phone by using the RF circuit 1010, or outputs the audio data to the memory 1020 for further processing.

Wi-Fi is a short distance wireless transmission technology. The mobile phone may help, by using the Wi-Fi module 1070, a user to receive and send an e-mail, browse a web page, access streaming media, and the like, which provides wireless broadband Internet access for the user. Although FIG. 19 shows the Wi-Fi module 1070, it may be understood that the Wi-Fi module 1070 is not a necessary component of the mobile phone, and the Wi-Fi module 1070 may be omitted as required provided that the scope of the essence of the present disclosure is not changed.

The processor 1080 is a control center of the mobile phone, and is connected to various parts of the entire mobile phone by using various interfaces and lines. By running or executing a software program and/or module stored in the memory 1020, and invoking data stored in the memory 1020, the processor 1080 executes various functions of the mobile phone and performs data processing, thereby monitoring the entire mobile phone. Optionally, the processor 1080 may include one or more processing units. Preferably, the processor 1080 may integrate an application processor and a modem processor. The application processor mainly processes an operating system, a user interface, an application program, and the like. The modem processor mainly processes wireless communication. It may be understood that the modem processor may alternatively not be integrated into the processor 1080. The mobile phone further includes the power supply 1090 (such as a battery) for supplying power to the components. Preferably, the power supply may be logically connected to the processor 1080 by using a power management system, thereby implementing functions such as charging, discharging, and power consumption management by using the power management system.

Although not shown in the figure, the mobile phone may further include a camera, a Bluetooth module, and the like, and details are not further described herein.

In an embodiment of this application, the processor 1080 included in the terminal further controls and performs a procedure of a sequence model processing method performed by the terminal.

Figure 20:
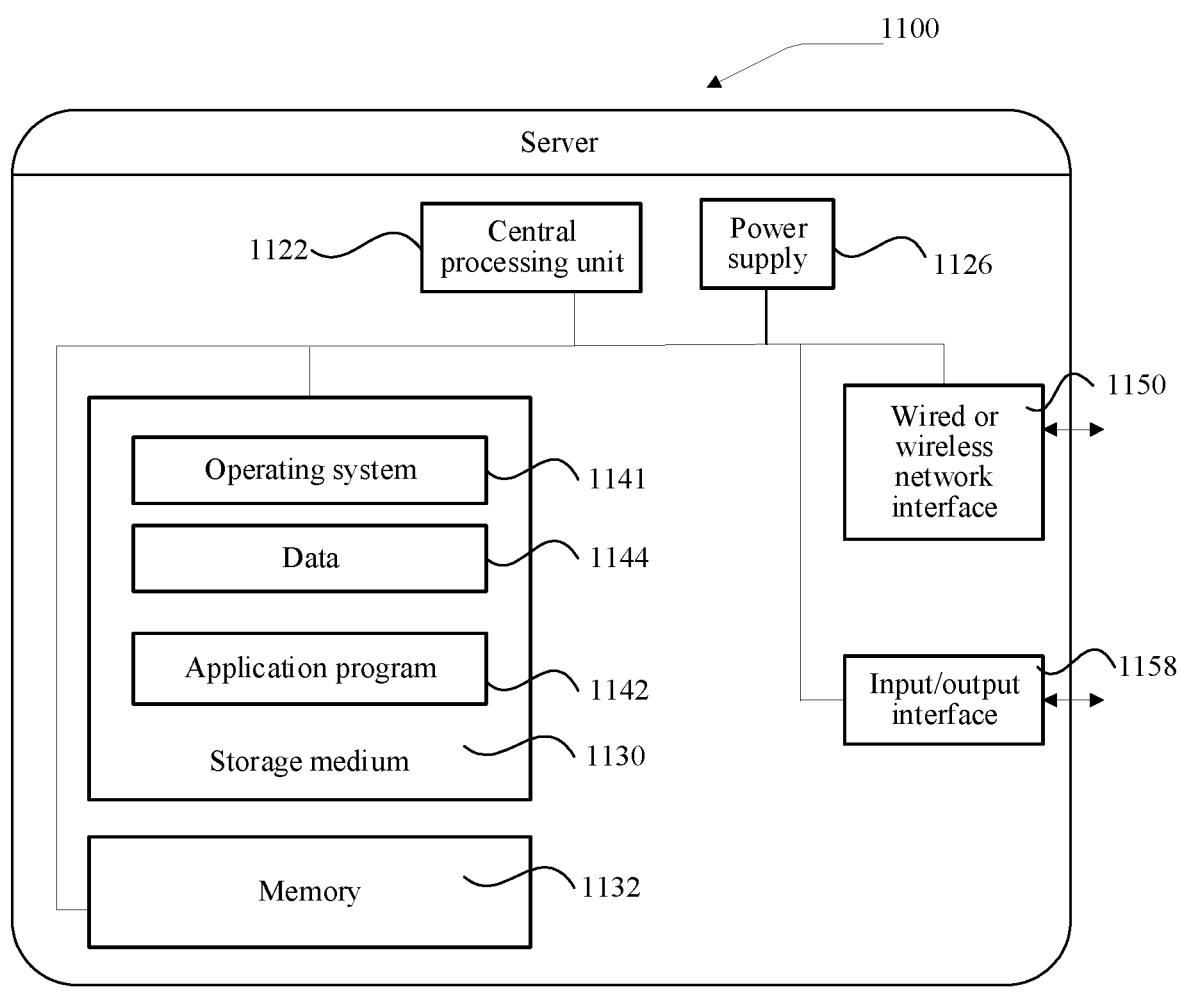
FIG. 20 is a schematic diagram of a composition structure of a server to which a sequence model processing method is applied according to an embodiment of this application.

FIG. 20 is a schematic structural diagram of a server according to an embodiment of this application. The server 1100 may vary greatly due to different configurations or performance, and may include one or more central processing units (CPU) 1122 (for example, one or more processors) and a memory 1132, and one or more storage media 1130 (for example, one or more mass storage devices) that store application programs 1142 or data 1144. The memory 1132 and the storage medium 1130 may be transient or persistent storage. The program stored in the storage medium 1130 may include one or more modules (not shown in the figure), and each module may include a series of instructions and operations for the server. Further, the CPU 1122 may be set to communicate with the storage medium 1130, and perform, on the server 1100, the series of instructions and operations in the storage medium 1130.

The server 1100 may further include one or more power supplies 1126, one or more wired or wireless network interfaces 1150, one or more input/output interfaces 1158, and/or one or more operating systems 1141 such as Windows Server™, Mac OS X™, Unix™, Linux™, or FreeBSD™.

The steps of the sequence model processing method performed by the server in the foregoing embodiments may be based on the server structure shown in FIG. 20.

In addition, the described apparatus embodiment is merely exemplary. The units described as separate parts may or may not be physically separate, and parts displayed as units may or may not be physical units, may be located in one position, or may be distributed on a plurality of network units. Some or all of the modules may be selected based on an actual requirement, to achieve the objectives of the solutions of the embodiments. In addition, in the accompanying drawings of the apparatus embodiments provided in this application, connection relationships between modules indicate that the modules have communication connections with each other, which may be specifically implemented as one or more communication buses or signal cables. A person of ordinary skill in the art may understand and implement the embodiments of this application without creative efforts.

Based on the descriptions of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions implemented by a computer program can be easily implemented by using corresponding hardware. Moreover, a specific hardware structure used to achieve the same function may be of various forms, for example, in a form of an analog circuit, a digital circuit, or a dedicated circuit. However, for this application, software program implementation is a better implementation in most cases. Based on such an understanding, the technical solutions of this application essentially or the part contributing to the related art may be implemented in a form of a software product. The computer software product is stored in a non-transitory computer readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the method described in the embodiments of this application.

To sum up, the foregoing embodiments are merely intended for describing the technical solutions of this application, but not for limiting this application. Although this application is described in detail with reference to the foregoing embodiments, it is to be understood by a person of ordinary skill in the art that they may still make modifications to the technical solutions described in the foregoing embodiments or make equivalent replacements to some technical features thereof, without departing from the spirit and scope of the technical solutions of the embodiments of this application.

What is claimed is:

1. A sequence model processing method, applicable to a computer device, the method comprising:
   inputting a first sequence of words having a first language into an encoder side of a sequence model, the encoder side comprising a self-attention encoder and a temporal encoder, wherein the temporal encoder comprises an encoding layer having a time series information network and a first feed-forward network;
   encoding the first sequence of words having the first language using the temporal encoder to obtain a first encoding result, the first encoding result comprising time series information obtained by performing time series modeling on the first sequence of words having the first language, the encoding further including:
      performing time series modeling on the first sequence of words having the first language by using the time series information network, to obtain the time series information; and
      unidirectionally propagating the time series information by using the first feed-forward network, and outputting the first encoding result;
   while encoding the first sequence of words having the first language using the temporal encoder, encoding, in parallel, the first sequence of words having the first language using the self-attention encoder, to obtain a second encoding result;
   inputting a target sequence, the first encoding result, and the second encoding result into a decoder side of the sequence model; and
   decoding the target sequence, the first encoding result, and the second encoding result using the decoder side to obtain a second sequence of words having a second language that is different from the first language, and outputting the second sequence of words in the second language.

2. The method according to claim 1, wherein the temporal encoder comprises N encoding layers, N being a positive integer; a first encoding layer in the temporal encoder comprises a first time series information network and the first feed-forward network; the first time series information network comprises a first neural network and a first normalization network; and
   the performing time series modeling on the first sequence of words having the first language by using the time series information network, to obtain the time series information comprises:
      performing time series modeling on the first sequence of words having the first language by using the first neural network; and
      performing, by using the first normalization network, normalization transformation on a result obtained through time series modeling, to obtain the time series information.

3. The method according to claim 2, wherein a second encoding layer in the temporal encoder comprises a second time series information network and the first feed-forward network; the second time series information network comprises a second neural network, a first residual network, and a second normalization network; and
   the performing time series modeling on the first sequence of words having the first language by using the time series information network further comprises:
      performing, after the first feed-forward network in the first encoding layer outputs a first sublayer encoding result, time series modeling on the first sublayer encoding result by using the second neural network;
      performing, by using the first residual network, residual calculation on a result obtained through time series modeling; and
      performing, by using the second normalization network, normalization transformation on a result obtained through residual calculation, to obtain the time series information.

4. The method according to claim 3, wherein the second neural network is one selected from the group consisting of a bidirectional neural network, a RNN, and an ARN.

5. The method according to claim 2, wherein the first neural network is one selected from the group consisting of a bidirectional neural network, a recurrent neural network (RNN), and an attentive recurrent network (ARN).

6. The method according to claim 1, wherein the decoder side comprises a decoding layer, the decoding layer comprising a self-attention network, an attention network, and a second feed-forward network; and
   the inputting the target sequence, the first encoding result, and the second encoding result into a decoder side of the sequence model comprises:
      inputting the target sequence into the self-attention network; and
      inputting the first encoding result and the second encoding result into the attention network.

7. The method according to claim 6, wherein the decoding the target sequence, the first encoding result, and the second encoding result by using the decoder side comprises:
   performing sequence transformation on the target sequence by using the self-attention network, to obtain a first query key-value pair sequence;
   inputting the first query key-value pair sequence into the attention network, and performing relationship modeling on the first query key-value pair sequence, the first encoding result, and the second encoding result by using the attention network, to obtain relationship information; and
   unidirectionally propagating the relationship information by using the second feed-forward network, to obtain the second sequence of words in the second language.

8. The method according to claim 7, wherein the attention network comprises a first attention sublayer and a second attention sublayer, the first encoding result is inputted into the first attention sublayer, and the second encoding result is inputted into the second attention sublayer;

the first attention sublayer comprises a first multi-head attention network, a second residual network, and a third normalization network;

the second attention sublayer comprises a second multi-head attention network, a third residual network, and a fourth normalization network; and the performing relationship modeling on the first query key-value pair sequence, the first encoding result, and the second encoding result by using the attention network comprises:

separately inputting the first query key-value pair sequence into the first attention sublayer and the second attention sublayer;

performing relationship modeling on the first query key-value pair sequence and the first encoding result by using the first multi-head attention network, to obtain first relationship sub-information, performing residual calculation on the first relationship sub-information by using the second residual network, and performing, by using the third normalization network, normalization transformation on a result obtained through residual calculation, to obtain an output result of the first attention sublayer;

performing relationship modeling on the first query key-value pair sequence and the second encoding result by using the second multi-head attention network, to obtain second relationship sub-information, performing residual calculation on the second relationship sub-information by using the third residual network, and performing, by using the fourth normalization network, normalization transformation on a result obtained through residual calculation, to obtain an output result of the second attention sublayer; and performing fusion calculation on the output result of the first attention sublayer and the output result of the second attention sublayer, to obtain the relationship information.

9. The method according to claim 7, wherein the attention network comprises a first attention sublayer and a second attention sublayer, the first encoding result is inputted into the first attention sublayer, and the second encoding result is inputted into the second attention sublayer;

the first attention sublayer comprises a first multi-head attention network, a second residual network, and a third normalization network;

the second attention sublayer comprises a second multi-head attention network, a third residual network, and a fourth normalization network; and the performing relationship modeling on the first query key-value pair sequence, the first encoding result, and the second encoding result by using the attention network comprises:

inputting the first query key-value pair sequence into the second attention sublayer;

performing relationship modeling on the first query key-value pair sequence and the second encoding result by using the second multi-head attention network, to obtain third relationship sub-information, performing residual calculation on the third relationship sub-information by using the third residual network, and performing, by using the fourth normalization network, normalization transformation on a result obtained through residual calculation, to obtain an output result of a third attention sublayer; and inputting the output result of the third attention sublayer into the first attention sublayer, performing relationship modeling on the output result of the third attention sublayer and the first encoding result by using the first multi-head attention network, to obtain fourth relationship sub-information, performing residual calculation on the fourth relationship sub-information by using the second residual network, and performing, by using the third normalization network, normalization transformation on a result obtained through residual calculation, to obtain the relationship information.

10. The method according to claim 6, wherein the decoder side comprises M decoding layers, M being a positive integer greater than 1;

only the second encoding result is inputted into the first to the $(M-1)^{th}$ decoding layers of the decoder side, and the first encoding result is not inputted; and the first encoding result and the second encoding result are inputted into the $M^{th}$ decoding layer of the decoder side.

11. A computing device, comprising a processor and a memory;

the memory being configured to store a plurality of instructions; and the processor being configured to execute the instructions in the memory, to perform a plurality of operations including:

inputting a first sequence of words having a first language into an encoder side of a sequence model, the encoder side comprising a self-attention encoder and a temporal encoder, wherein the temporal encoder comprises an encoding layer having a time series information network and a first feed-forward network;

encoding the first sequence of words having the first language using the temporal encoder to obtain a first encoding result, the first encoding result comprising time series information obtained by performing time series modeling on the first sequence of words having the first language, the encoding further including:

performing time series modeling on the first sequence of words having the first language by using the time series information network, to obtain the time series information; and unidirectionally propagating the time series information by using the first feed-forward network, and outputting the first encoding result;

while encoding the first sequence of words having the first language using the temporal encoder, encoding, in parallel, the first sequence of words having the first language using the self-attention encoder, to obtain a second encoding result;

inputting a target sequence, the first encoding result, and the second encoding result into a decoder side of the sequence model; and decoding the target sequence, the first encoding result, and the second encoding result using the decoder side to obtain a second sequence of words having a second language that is different from the first language, and outputting the second sequence of words in the second language.

12. The computing device according to claim 11, wherein the temporal encoder comprises N encoding layers, N being a positive integer; a first encoding layer in the temporal encoder comprises a first time series information network and the first feed-forward network; the first time series information network comprises a first neural network and a first normalization network; and the performing time series modeling on the first sequence of words having the first language by using the time series information network, to obtain the time series information comprises:
  performing time series modeling on the source first sequence by using the first neural network; and
  performing, by using the first normalization network, normalization transformation on a result obtained through time series modeling, to obtain the time series information.

13. The computing device according to claim 12, wherein a second encoding layer in the temporal encoder comprises a second time series information network and the first feed-forward network; the second time series information network comprises a second neural network, a first residual network, and a second normalization network; and
  the performing time series modeling on the first sequence of words having the first language by using the time series information network further comprises:
    performing, after the first feed-forward network in the first encoding layer outputs a first sublayer encoding result, time series modeling on the first sublayer encoding result by using the second neural network;
    performing, by using the first residual network, residual calculation on a result obtained through time series modeling; and
    performing, by using the second normalization network, normalization transformation on a result obtained through residual calculation, to obtain the time series information.

14. The computing device according to claim 11, wherein the decoder side comprises a decoding layer, the decoding layer comprising a self-attention network, an attention network, and a second feed-forward network; and
  the inputting the target sequence, the first encoding result, and the second encoding result into a decoder side of the sequence model comprises:
    inputting the target sequence into the self-attention network; and
    inputting the first encoding result and the second encoding result into the attention network.

15. A non-transitory computer-readable storage medium storing a plurality of instructions that, when executed by a processor of a computing device, cause the computing device to perform a plurality of operations including:
  inputting a first sequence of words having a first language into an encoder side of a sequence model, the encoder side comprising a self-attention encoder and a temporal encoder, wherein the temporal encoder comprises an encoding layer having a time series information network and a first feed-forward network;
  encoding the first sequence of words having the first language using the temporal encoder to obtain a first encoding result, the first encoding result comprising time series information obtained by performing time series modeling on the first sequence of words having the first language, the encoding further including:
    performing time series modeling on the first sequence of words having the first language by using the time series information network, to obtain the time series information; and
    unidirectionally propagating the time series information by using the first feed-forward network, and outputting the first encoding result;
  while encoding the first sequence of words having the first language using the temporal encoder, encoding, in parallel, the first sequence of words having the first language using the self-attention encoder, to obtain a second encoding result;
  inputting a target sequence, the first encoding result, and the second encoding result into a decoder side of the sequence model; and
  decoding the target sequence, the first encoding result, and the second encoding result using the decoder side to obtain a second sequence of words having a second language that is different from the first language, and outputting the second sequence of words in the second language.

16. The non-transitory computer-readable storage medium according to claim 15, wherein the temporal encoder comprises N encoding layers, N being a positive integer; a first encoding layer in the temporal encoder comprises a first time series information network and the first feed-forward network; the first time series information network comprises a first neural network and a first normalization network; and
  the performing time series modeling on the first sequence of words having the first language by using the time series information network, to obtain the time series information comprises:
    performing time series modeling on the first sequence of words having the first language by using the first neural network; and
    performing, by using the first normalization network, normalization transformation on a result obtained through time series modeling, to obtain the time series information.

17. The non-transitory computer-readable storage medium according to claim 15, wherein the decoder side comprises a decoding layer, the decoding layer comprising a self-attention network, an attention network, and a second feed-forward network; and
  the inputting the target sequence, the first encoding result, and the second encoding result into a decoder side of the sequence model comprises:
    inputting the target sequence into the self-attention network; and
    inputting the first encoding result and the second encoding result into the attention network.

* * * * *